United States Patent [19]
Harms et al.

[11] Patent Number: 5,220,836
[45] Date of Patent: Jun. 22, 1993

[54] METHOD AND ARRANGEMENT FOR PIEZOELECTRIC MEASUREMENT

[75] Inventors: Klaus-Christoph Harms, Graz; Peter W. Krempl, Kainbach; Joseph Moik, Graz, all of Austria

[73] Assignee: AVL Gesellschaft für Verbrennungskraftmaschinen und Messtechnick mbH., Prof.Dr.Dr.h.c. Hans List, Austria

[21] Appl. No.: 613,806
[22] PCT Filed: Apr. 18, 1990
[86] PCT No.: PCT/AT90/00033
  § 371 Date: Dec. 26, 1990
  § 102(e) Date: Dec. 26, 1990
[87] PCT Pub. No.: WO90/13010
  PCT Pub. Date: Nov. 1, 1990

[30] Foreign Application Priority Data
Apr. 27, 1989 [AT] Austria .................................. 1015/89

[51] Int. Cl.$^5$ ............................................... G01L 1/16
[52] U.S. Cl. ............................... 73/702; 73/862.41;
    73/862; 73/59; 73/DIG. 4; 310/338
[58] Field of Search ............. 73/754, 702, 703, DIG. 4,
    73/862.41, 862.59, 32 A, 704, 517 AV, 290 V;
    128/DIG. 13; 310/323, 360, 329, 338, 361;
    374/177

[56] References Cited
U.S. PATENT DOCUMENTS
4,297,872 11/1981 Ikeda ...................................... 73/702
5,000,050 3/1991 Hetrick .................................. 73/702

*Primary Examiner*—Donald O. Woodiel
*Attorney, Agent, or Firm*—Hill, Steadman & Simpson

[57] ABSTRACT

A sensor containing at least one piezoelectric transducer element is operated via a common, single signal line in both possible operating modes—first, at low frequencies as a measuring element for a mechanical quantity upon utilization of the direct piezoeffect and, second, at higher frequencies as a piezoelectric resonator upon utilization of the inverse piezoeffect for electrical excitation of mechanical oscillations and of the direct piezoeffect for generating the piezoelectric reaction. A high-frequency signal ($u^{HF}$, $u_F$) that describes the resonant characteristic and a lower-frequency signal ($u_{NF}$, $u_Q$) that describes the mechanical influence are generated from the measured signal on the signal line. The faultless function of the sensor together with the appertaining measuring amplifier, for example, can thus be monitored immediately during a measurement with the sensor or a simultaneous measurement of two different quantities can be undertaken.

30 Claims, 8 Drawing Sheets

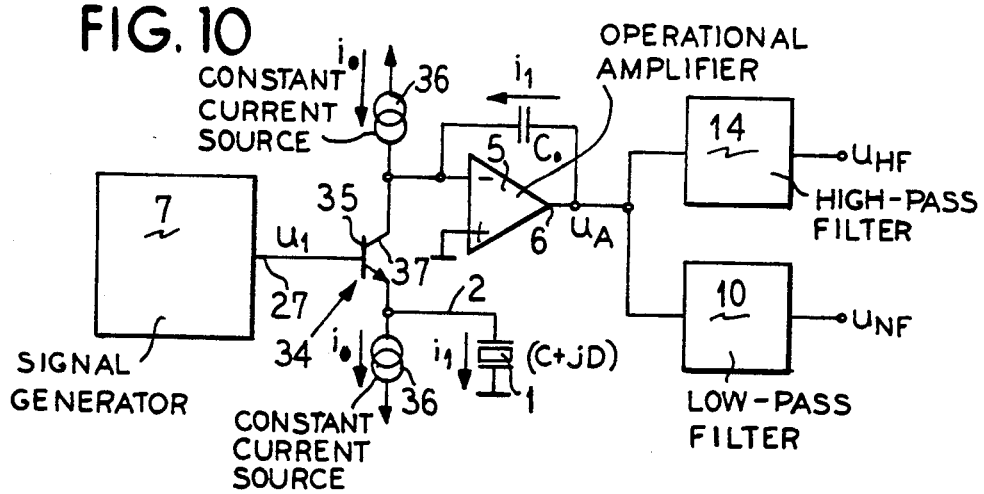
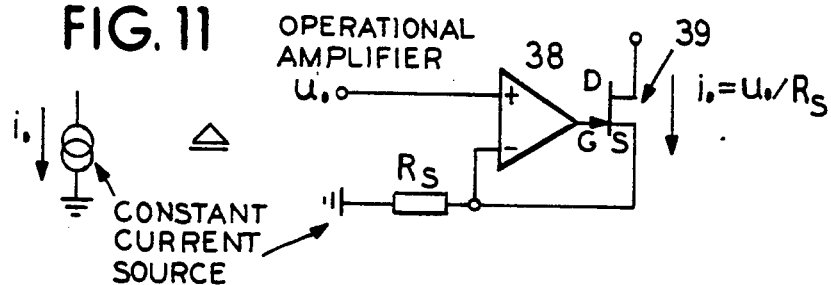
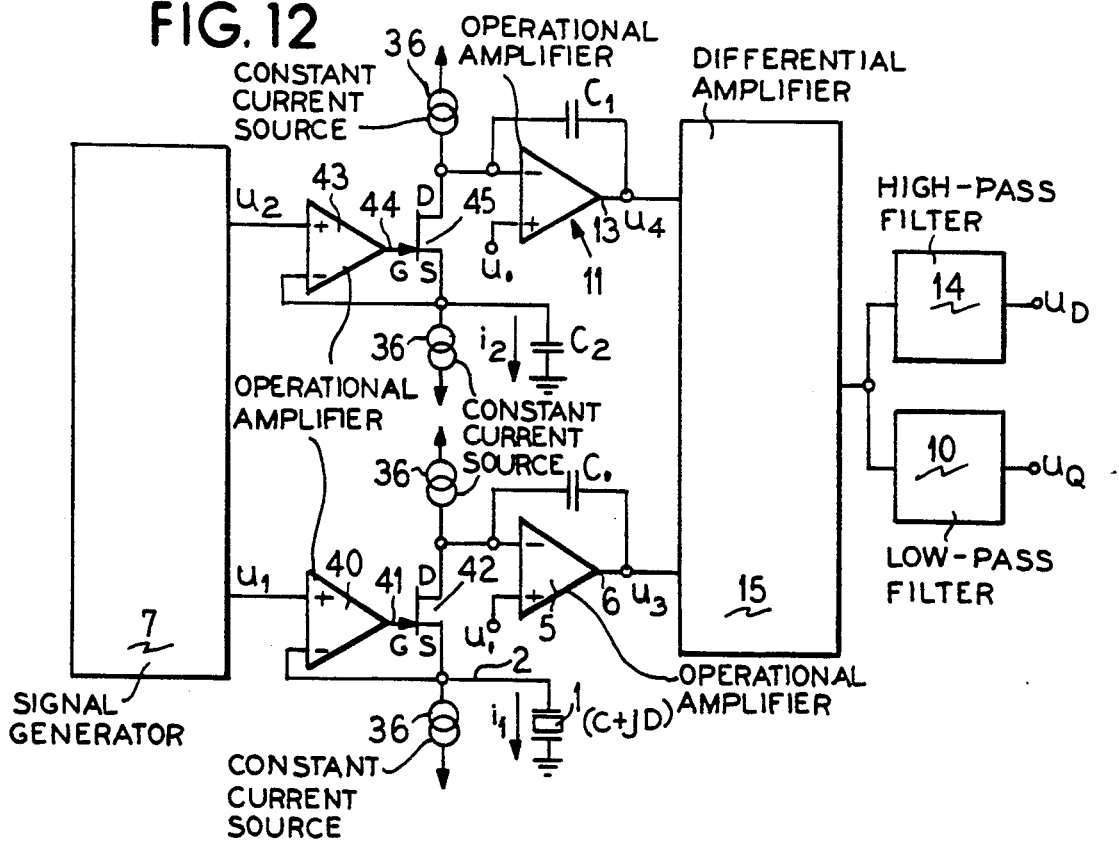

METHOD AND ARRANGEMENT FOR PIEZOELECTRIC MEASUREMENT

TECHNICAL FIELD

The invention is directed to a measuring method for identifying or, respectively, for monitoring mechanical and/or physical quantities, whereby a sensor containing at least one piezoelectric transducer element is exposed to the quantity to be identified or, respectively, monitored and an electrical sensor signal influenced by this quantity is evaluated as measured signal. The invention is also directed to a measuring arrangement comprising a sensor containing at least one piezoelectric transducer element and comprising a measuring amplifier in communication therewith via a signal line together with electrical return; the invention is also directed to advantageous employments of such an inventively equipped measuring arrangement.

PRIOR ART

Methods and arrangements of the said species are known in the greatest variety of contexts and are being employed to an increasing degree. Thus, Austrian Patent 276,810 discloses a piezoelectric sensor that, for example, can be employed for monitoring the combustion process in the combustion chamber of an internal-combustion engine. To this end, the sensor is introduced in sealing fashion into an indicator bore of the wall of the combustion chamber and a suitable measuring amplifier is connected to the signal output of the measured value pick-up, this evaluating the measured signals generated by the piezoelectric transducer element via the direct piezoeffect given pressure fluctuations in the inside of the combustion chamber. The disadvantage of this known arrangement or, respectively, of the measuring method appertaining thereto is comprised therein that the piezoelectric transducer elements can have relatively pronounced zero shifts due to the resistances and leakage currents that are always present, so that measurements of practically only dynamic pressure changes—or, respectively, of changes of quantities to be measured having a defined frequency—can be meaningfully implemented and that, correspondingly, no absolute or static measurements can be carried out. Further, there is also no possibility of checking or, respectively, adjusting the sensor in the measuring chain with respect to its correct function, so that there are always certain uncertainties in view of the measured result.

Further, piezoelectric sensors are also known which are suitable for static or, respectively, quasi-static measurements due to the nature and arrangement of their transducer elements or, respectively, due to the execution of the measuring method and the nature of the interpretation of the measured signals. Thus, for example, Austrian Patent 353,506 discloses a piezoelectric sensor with which various quantities such as, for example, temperature or pressure can be identified or, respectively, monitored via the change in the resonant behavior of a piezoelectric resonator arranged in the sensor. Such sensors have an extremely high resolution but usually have only an extremely low dynamics because of the high counting rates required therefor. In addition, the disadvantage that the sensor cannot be monitored or adjusted in view of its function in the measuring chain continues to exist given these arrangements or, respectively, methods.

Finally, Austrian Patent 369,900 also discloses, for example, a piezoelectric sensor that contains transducer elements of the above-recited type combined both for static as well as for dynamic measurements, high resolution and dynamics on the one hand and employability for static or, respectively, quasi-static measurements on the other hand being therewith achieved. Disadvantages thereby derive insofar as the sensor itself must be constructed in a relatively complicated way due to the two transducer elements together with independent feeds or, respectively, signal lines and thus does not come into consideration for many applications. Further, the measuring amplifiers respectively required for the two separately sequencing measuring methods must be offered, connected, etc., this increasing the measuring outlay overall and producing further possibilities of error.

SUMMARY OF THE INVENTION

An object of the present invention is to improve measuring methods and arrangements of the said species such that the recited disadvantages of the known methods and arrangements are avoided and such that mechanical and/or physical quantities of the greatest variety of types and frequencies of change can be identified or, respectively, monitored with a simply constructed sensor, particularly, in a structurally and mensurationally simple way.

In a measuring method of the species initially cited, this is achieved by the present invention in that the sensor is operated via a common, single signal line together with electrical return in both possible operating modes—on the one hand, at low frequencies as measuring element for a mechanical quantity upon utilization of the direct piezoeffect and, on the other hand, at higher frequencies as a piezoelectric resonator upon utilization of the inverse piezoeffect for the electrical excitation of mechanical oscillations and of the direct piezoeffect for generating the piezoelectric reaction. A higher-frequency signal that describes the resonant characteristic and a lower-frequency signal that describes the mechanical influence and is preferably charge-proportional are generated from the measured signal on the signal line. In the most simple case, no structural modification whatsoever is thus required at the piezoelectric sensor itself. This embodiment of the method exploits the fact that the frequency of the excitation signal of a transducer element operated as a piezoelectric resonator lies above—and usually far above—the frequencies of change that occur for mechanical and/or physical quantities that are to be identified or, respectively, to be monitored, so that the corresponding characteristic frequencies in the measured signal are separable and can be separately evaluated for the identification of the two relevant signals.

For example, a measuring amplifier can thus be constructed that has a frequency output where the respective resonant frequency of the piezoelectric transducer element connected thereto can be read.

Insofar as it has a pronounced pressure dependency, the pressure can be read via the interpretation of this resonant frequency, this corresponding to a static or, respectively, quasi-static pressure measurement. Insofar as this resonant frequency has an unambiguous temperature dependency, the temperature of the transducer elements can be directly measured or monitored in this way. It is also possible to simply consider this resonant frequency as significant for the functioning of the transducer element, this making it possible to identify whether the respective measuring chain is still faultlessly functioning. A statement about the complete measuring chain can thereby in fact be obtained since, of course, for example, the functioning of the charge amplifier is also necessary for the functioning of the resonator—i.e., even when the measuring amplifier or a cable is faulty this can be read from the shift of the resonant frequency identified as set forth above.

For the mensurationally most simple case when, namely, the two frequency ranges under discussion lie adequately far apart, a decoupling of the two relevant signals in the measured signal with an inductance and with a capacitor (also see FIG. 1 and the appertaining description) suffices for the implementation of the measuring method. Since the lower frequency range of the first operating mode given, for example, crystal pressure pick-up devices extends into the close proximity of the frequency range the second operating mode, this simple LC decoupling is usually not adequate. The inventive fashioning of the measuring arrangement accordingly provides that the sensor is in communication via a common, single signal line with the inverting input of a charge amplifier arranged in the measuring amplifier for the operation of the sensor in the two possible operating modes—on the one hand, at low frequencies as measuring element for a mechanical quantity upon utilization of the direct piezoeffect and, on the other hand, at higher frequencies as a piezoelectric resonator upon utilization of the inverse piezoeffect for electrical excitation of mechanical oscillations and of the direct piezoeffect for generating the piezoelectric reaction. The charge amplifier, further, is in communication with the output of a signal generator and is driven by the latter with a frequency signal whose mean value is equal to the potential of the electrical return, and the output of an operational amplifier arranged in the charge amplifier and fed back via a capacitor onto the inverting input is in communication with, first, the input of a high-pass filter at whose output a signal $u_{HF}$ dependent on the resonant characteristic can be taken and, second, with the input of a low-pass filter at whose output a lower-frequency charge amplifier signal $u_{NF}$ can be taken. The charge amplifier thus acts as part of the resonance detector serving the purpose of evaluating the reaction of the oscillation excitation. Together with the connected piezoelectric transducer element, the feedback capacitor of the charge amplifier forms a voltage divider that serves both for exciting oscillation as well as for detecting the piezoelectric reaction.

Here, as in the following as well, a band-pass filter having a suitable lower and, respectively, upper limit frequency can also be respectively employed, of course, instead of high-pass filters and/or low-pass filters.

It is accordingly provided in a further development of the measuring method that a higher-frequency excitation signal for exciting the sensor to mechanical oscillations is supplied via the signal line, a signal of the same frequency generated subsequently due to the piezoelectric reaction of the sensor and a low-frequency signal generated by the sensor as a consequence of mechanical, lower-frequency influences being superimposed thereon, whereby the low-frequency part of the measured signal on the signal line is virtually shorted and the short-circuit current thereby appearing is amplified for further signal processing and is preferably integrated to a charge-proportional output signal.

In accord with two alternative proposals of the invention for the actual signal processing in the above context, either the higher-frequency part of the measured signal can be capacitatively decoupled from the low-frequency part on the signal line or, on the other hand, it can be provided that the higher-frequency excitation signal is impressed voltage-wise on the signal line and the entire current through the sensor, higher-frequency and low-frequency parts, is utilized for the further signal processing. Both are simple and effective possibilities for implementing or, respectively, for improving the measuring method of the invention that assure a clean separation of the relevant signals from the measured signal even when the frequency ranges for the two operating modes lie close together.

For the former alternative, the measuring arrangement of the invention is fashioned such that the frequency signal output of the signal generator is connected to the non-inverting input of the charge amplifier. It is provided for the second alternative, according to the present invention that the frequency signal output of the signal generator is connected to the signal line of the sensor via an emitter follower, that a respective constant current source is inserted in the emitter line and in the collector line of the emitter follower transistor, and that the collector of the emitter follower transistor is connected to the inverting input of the charge amplifier, whereby, for example, the non-inverting input can also lie at a quiescent potential, preferably at the potential of the electrical return, so that the collector potential of the emitter follower transistor is set to a value suitable for the operation of the transistor.

It is provided in a further development of the measuring method of the invention that, for forming the higher-frequency signal, the difference between a reference signal that is uninfluenced by the sensor and corresponds to the excitation signal in terms of frequency and phase and the measured signal is formed, whereby the excitation signal and the reference signal are tunable relative to one anther in terms of their amplitudes. The amplitude tuning, further, can thereby be undertaken such that the real part of the higher-frequency signal disappears. These improvements of the fundamental measuring method of the present invention allow a clearer output signal characteristic of the resonances of the transducer element to be acquired. When the real part of the higher-frequency signal is caused to disappear due to the amplitude tuning, then the desired quantity that is proportional to the dissipative part of the transducer capacitance that has a complex value is obtained. As before, the post-amplified signal of the actual charge amplifier can be simultaneously measured, this being proportional to the influencing, mechanical quantity.

For offering the frequency signals serving for the excitation of the oscillation, the band-pass-filter, higher-frequency signal in a further development of the measuring method of the invention can be actively fed back in-phase, preferably with automatic tuning of the loop gain to the factor 1. An oscillator is thus realized with the resonance measurement itself, so that a separate signal generator or the like for the excitation of the transducer element is superfluous.

For realizing the above-described (reference difference) method, it is provided in a development of the measuring arrangement of the invention that the signal generator comprises a further frequency signal output that—with reference to the signal $u_1$ applied at the non-inverting input of the charge amplifier—carries a reference signal u, that is the same in frequency and phase and is tunable in amplitude and that is connected to the non-inverting input of a reference charge amplifier. The inverting input of an operational amplifier arranged in the reference charge amplifier is connected via a capacitor to the potential of the return and is fed back via a further capacitor to its output. The output of the reference charge amplifier conducted via a further high-pass filter as well as the output of the high-pass filter carrying the signal $u_{HF}$ is connected to a differential amplifier at whose output a signal $u_D$ describing the resonance characteristic can be taken. The substraction between the two signals $u_1$ and $u_2$ undertaken in this context can be implemented not only with a differential amplifier—when assuming equiphase signals $u_1$ and $u_2$—but, of course, can also be implemented with an adding amplifier—given anti-phase signals $u_1$ and $u_2$. Further, the sequence of filtering and substraction, of course, could also be interchanged as needed. In principle, one of the main effects of the piezoelectric transducer, namely to behave like a capacitor, is subtracted out of the measured signal by this development of the measuring arrangement, so that the resonance behavior somewhat masked by the high basic capacitance appears more clearly.

Further, it can also be provided in the latter context that the output of the low-pass filter carrying the signal $u_{HF}$ is connected to the input of a booster amplifier at whose output an edited signal $u_Q$ is available, this enabling a clearer statement with respect to the lower-frequency parts of the measured signal as well.

It is provided in an especially preferred, further development of this measuring arrangement that the high-pass-filtered output of the differential amplifier is in communication with a synchronous demodulator that is further connected to a unit for generating a phase reference which is in turn connected to the signal generator, preferably to one of the frequency signal outputs thereof, and that the output of the synchronous demodulator is connected to the actual value input of a control circuit that further comprises a reference value input and a manipulated variable output, the latter being connected to a tuning unit for tuning the relative amplitudes of the two output signals $u_1$, $u_2$ of the signal generator to one another. The measuring arrangement has thus been fundamentally expanded by a regulating unit for automatically tuning the relative amplitudes of the two output signals $u_1$, $u_2$. With the assistance of the phase reference derived, for example, from one of the signals $u_1$ or $u_2$, the real part of $u_D$ is acquired in the synchronous demodulator and is tuned to zero in the closed loop.

It can be provided in a further development of the said measuring arrangement that the high-pass-filtered output of the differential amplifier is connected to a further synchronous demodulator, that the further synchronous demodulator is connected to a phase reference unit which is in turn in communication with the frequency signal output of the signal generator fashioned as a VCO, that the output of the synchronous demodulator is connected to the input of a maximum controller that is in communication with the VCO for tuning said VCO that is preferably also roughly tunable independently thereof. The actual resonance measuring circuit is thus expanded to an oscillator. The VCO (voltage controlled oscillator) is set to the frequency of maximum dissipated power, i.e. to the resonant frequency (frequencies) of the transducer element with the assistance of the maximum controller. The imaginary part of $u_D$ is acquired in the second synchronous demodulator with the assistance of the phase reference and is supplied to the maximum controller as actual value.

A modification of this latter development of the measuring arrangement is characterized in a further embodiment of the invention in that the signal generator is fashioned as a VCO whose frequency signal output is also connected to the non-inverting input of an operational amplifier arranged in a reference charge amplifier whose inverting input is connected to the potential of the return via a variable capacitor and is fed back to its output via a further capacitor. The that the output of the reference charge amplifier just like the output of the charge amplifier itself is connected to a differential amplifier, the high-pass-filtered output of the differential amplifier is connected to a synchronous demodulator to which the output signal of a phase reference unit that is likewise connected to the frequency signal output of the VCO is supplied and that has its output connected to the actual value input of a controlling means, and the controlling means that further comprises a rated value input comprises a manipulated variable output that is connected to the frequency control input of the VCO. The measuring amplifier is thus fashioned for operation as a charge amplifier, on the one hand, and as oscillator for a frequency, on the other hand. The above-addressed controller for the automatic tuning of the relative amplitudes of the two output signals of the signal generator has been omitted and it has been provided instead that the required tuning be undertaken at the initialization of the circuit and not be re-tuned during operation. The tuning criterion that the real part of the signal $u_D$ should be equal to zero can thus be employed for generating any frequency for which this condition is satisfied. The pre-tuning can ensue manually or computer-controlled on the basis of a preceding analysis of the resonant characteristic of the transducer element acquired with the assistance of the resonance detector, so that the frequency is a resonant frequency of the piezoelectric transducer element. One or more of the capacitors as well as, under certain circumstances, a separately tunable capacitor parallel to the piezoelectric transducer element come into consideration as components to be tuned.

It is provided in an inventive alternative to the measuring arrangement addressed most recently above that the signal generator is realized with an active feedback of the signal $u_{HF}$ available at the output of the higher-pass filter executed as a band-pass filter to the non-inverting input of the charge amplifier as well as to the non-inverting input of a reference charge amplifier. The output of the reference charge amplifier just like the output of the charge amplifier is connected to a differential amplifier whose output is supplied to the band-pass filter and to the low-pass filter and an element that executes a phase angle rotation of 90° and, preferably, an automatic gain control (AGC) circuit are inserted in the active feedback. In this way, the measuring amplifier is fashioned as a charge amplifier and as an oscillator with direct feedback without an intervening VCO. The resonance detector that, for example, is initially tuned by hand with the assistance of a capacitor supplies a maximum output signal in the resonant case of the piezoelectric transducer element whose phase is turned by 90° in comparison to the exciting signal. In order to satisfy the feedback condition for unattenuated oscillations, the output signal must be additionally phase-rotated by 90°. The loop gain is controlled to the value 1 via the AGC unit. The band-pass filter serves the purpose of selecting a resonance within a defined frequency band. As in the other embodiments, the low-frequency signal of the charge amplifier can be taken via the low-pass filter.

Given employment of the measuring arrangement of the invention in, for example, conjunction with an accelerometer permanently integrated in an air craft, it is possible to carry out a remote interrogation proceeding, for example, from a monitoring station in order to find out whether the entire measuring chain is still in proper working order, i.e. whether one can in fact rely on the measured values indicating the respective load. The advantageous, inventive employment of a measuring arrangement of the described type for identifying or, respectively, monitoring mechanical and/or physical quantities via the lower-frequency parts of the measured signal on the signal line while simultaneously monitoring the function of the sensor via the resonant behavior characterized by the higher-frequency parts of the measured signal, whereby the sensor comprises a single transducer element that contains at least one piezoelement may also be seen in this context.

In a further proposal of the invention, the employment of a measuring arrangement of the species set forth herein is also possible for the simultaneous identification or, respectively, monitoring of at least two different mechanical and/or physical quantities, whereby the sensor comprises at least two separate transducer elements, each optimized for its respective job. These two transducer elements can be electrically and/or mechanically connected either parallel or in series, whereby the respectively optimal arrangement derives from the measurement job. Remaining in comparison to the prior art is the advantage that there is still only a single signal line and that the overall measuring arrangement remains shared and compact for the evaluation of the two relevant signals from the measured signal.

It is provided in a further development of the measuring arrangement of the invention that the frequency signal output of the signal generator lies at the non-inverting input of an operational amplifier whose output is connected to the gate of an FET that is in turn fed back via a source to the inverting input of the operational amplifier and is connected to a constant current source as well as to the signal line of the sensor. The inverting input of the charge amplifier is connected to the drain of the FET and to a further constant current source, whereby it can also be provided that the non-inverting input of the charge amplifier lies at a quiescent potential or, respectively, the potential of the electrical return. By analogy to the above-described measuring arrangement comprising the emitter follower between signal generator and signal line of the sensor, an arrangement controlled with the FET derives that is advantageous particularly in an expansion of the invention in accord wherewith it is provided that the signal generator comprises a further frequency signal output that is connected to the non-inverting input of a reference operational amplifier whose output is connected to the gate of a further FET that is in turn fed back via a source onto the inverting input of the reference operational amplifier and is connected to a constant current source as well as to a capacitor that, on the other hand, lies at the potential of the return. The inverting input of a reference charge amplifier is connected to the drain of the further FET and to a further constant current source, and further, the outputs of charge amplifier on the one hand, and of reference charge amplifier on the other hand, are supplied to a differential voltage amplifier whose output is connected to the input of the high-pass filter as well as of the low-pass filter. In accord with the expansion of the originally addressed fundamental principle of the measuring arrangement of the invention to form a resonance detector realized via a reference part, an arrangement is thus created whose sensitivity for the resonant characteristic can be significantly enhanced by subtractive compensation of the parallel capacitance of the transducer element. When the tuning of the two branches is undertaken such that the real part of the signal disappears due to the subtraction, then one obtains the desired quantity that is proportional to the dissipative part of the complex-valued transducer capacitance.

Modifying this most recently addressed measuring arrangement, it can also be provided in a further development of the invention that the frequency signal output of the signal generator is connected to at the non-inverting input of an operational amplifier whose output is connected to the gate of a FET that is in turn fed back via a source onto the inverting input of the operational amplifier and is connected to a constant current source as well as to the signal line of the sensor. The sensor generator comprises a further frequency signal output that is connected to the non-inverting input of a reference operational amplifier whose output is connected to the gate of a further FET that is in turn fed back over a source to the inverting input of the reference operational amplifier and is connected to a further constant current source as well as to a capacitor that has its other side lying at the potential of the electrical return. The drain terminals of the two FETs are supplied to a differential current amplifier whose current output is connected to the inverting input of the charge amplifier that has its non-inverting input lying at the potential of the electrical return. It may be seen therefrom that the signal substraction or, respectively, formation of differences can be implemented not with a differential voltage amplifier as set forth above but can also be implemented with a differential current amplifier, for example with a current mirror circuit. Instead of the two charge amplifiers for the currents of the sub-branches, a common charge amplifier for the differential current can thus also be utilized.

It is provided in a further development of the invention that the signal generator is realized with an active feedback of the signal available at the output of the high-pass filter executed as a band-pass filter to the non-inverting input of an operational amplifier as well as to the non-inverting input of a reference operational amplifier, that the output of these two operational amplifiers each respectively connected to the gate of a respective FET whose source respectively lies at a separate constant current source and is fed back onto the inverting input of the respective operational amplifier, whereby the signal line of the sensor is additionally connected to the source in the case of the operational amplifier and a connection from the source via a variable capacitor to the potential of the electrical return additionally exists in the case of the reference operational amplifier. The drain terminals of the two FETs are supplied to a differential current amplifier and i/u (current voltage) converter whose output is connected, first, to a band-pass filter and, second, to the inverting input of the charge amplifier via a resistor. An automatic gain control (AGC) circuit is preferably inserted in the feedback between band-pass filter and non-inverting inputs of the two operational amplifiers. Here, thus, a differential current amplifier is again employed, whereby, a proportional voltage signal is now generated from the differential current. For example, this can be amplified via an integrator, after which the signal proportional to the charge and, thus, to the mechanical input signal is again available via the low-pass filter. On the other hand, the voltage at the output of the differential current amplifier can be used in order to operate the circuit as a free-running oscillator with a closed feedback path. The AGC circuit again sees to the observation of the amplitude condition (loop gain equal to 1), whereby the phase condition (phase difference in the loop equal to zero) is also met in the resonant case of the piezoelectric transducer element. The band-pass filter serves for the selection of the desired resonant frequency of the transducer element. In this development, the frequency signal that characterizes the resonant frequency of the transducer can be taken, for example, following the band-pass filter.

In this latter context, a driver stage that generates antiphase frequency signals for the two operational amplifiers can also be inserted between the automatic gain control circuit and the non-inverting inputs of the two operational amplifiers in a further development of the invention and a current addition circuit can be provided instead of the differential current amplifier. Differing from that set forth above, the required subtraction is not carried out by forming the differential current of the currents generated by the two equiphase signals but is carried out by generating antiphase signals and by subsequent addition of the resultant currents. The current-to-voltage converter, for example, can be constructed with the assistance of an operational amplifier fed back via a resistor. The two antiphase voltage signals that have been addressed can be generated with the assistance of a differential amplifier having symmetrical outputs.

It can be provided in an especially preferred, further inventive fashioning of this most recently described measuring arrangement that the driver stage comprises an additional unit for amplitude tuning of the two antiphase frequency signals, that the high-pass-filtered output of the charge amplifier is in communication with a synchronous demodulator that is also connected to a unit for generating a phase reference which is in turn in communication with one of the non-inverting inputs of the operational amplifiers, and that the output of the synchronous demodulator is connected to the actual value input of a controlling means that also comprises a reference value input and a manipulated variable output whereof the latter is connected to the unit for the amplitude tuning. A precision oscillator and charge amplifier for the piezoelectric transducer element thereby derives, whereby the tuning of the circuit again automatically ensues with the assistance of an amplitude tuning of the antiphase frequency signals that is controlled by a control circuit that compares the reference value zero to the actual value supplied by a synchronous rectifier. A rough adjustment of the phase condition of the oscillator circuit is achieved in this way. The fine setting of the phase condition and, in conjunction with the AGC circuit, the setting of the amplitude condition occurs only at the resonant frequency of the piezoelectric transducer element because of the co-coupling of the circuit, this resonant frequency being selected via the mentioned band-pass filter.

BRIEF DESCRIPTION OF THE DRAWINGS

The invention shall also be set forth in greater detail below with reference to the circuit diagrams shown partially schematically on the drawings. Shown are:

FIGS. 4 through 10 and FIGS. 12 through 16, respectively, are schematic representations of measuring arrangements constructed in accordance with the present invention;

FIG. 11 is a schematic illustration of a known embodiment of a constant current source employed according to FIGS. 10 and 12 through 16, and FIGS. 17 through 19 are schematic representations of respective examples of a sensor for employment in a measuring arrangement in accordance with the invention or, respectively, with the corresponding measuring method.

DESCRIPTION OF THE PREFERRED EMBODIMENTS

As already set forth above, a sensor comprising at least one piezoelectric transducer element is placed in operation in accord with the present invention in two ways (simultaneously) via a common, single signal line:

1) an actual piezotransducer, based on the direct piezoeffect, whereby an electrical charge signal is generated at the output given an acting, mechanical quantity (for example force, pressure, acceleration, etc.); and 2) as a piezoresonator, based, first, on the reciprocal piezoeffect that enables the electrical excitation of the transducer element to execute mechanical oscillations and, second, on the direct piezoeffect on the basis whereof a piezoelectric reaction onto the excitation signal occurs.

For the first operating mode, a charge amplifier is preferably provided for interpretation that generates a (virtual) short-circuit at the transducer element. In the second operating mode, the transducer element dare not be short-circuited since, of course, it must be excited to oscillate with an electrical signal so that the piezoelectric reaction of these oscillations onto the excitation signal becomes measurable. When it is then considered that the first operating mode meaningfully occurs at frequencies that lie below the resonant frequencies of the transducer element that are important for the second operating mode, then the requirement for a measuring amplifier derives that acts as a charge amplifier for low frequencies and excites the transducer element to oscillations at higher frequencies, the piezoelectric reaction thereof onto the excitation signal having to be measurable.

Figure 1:
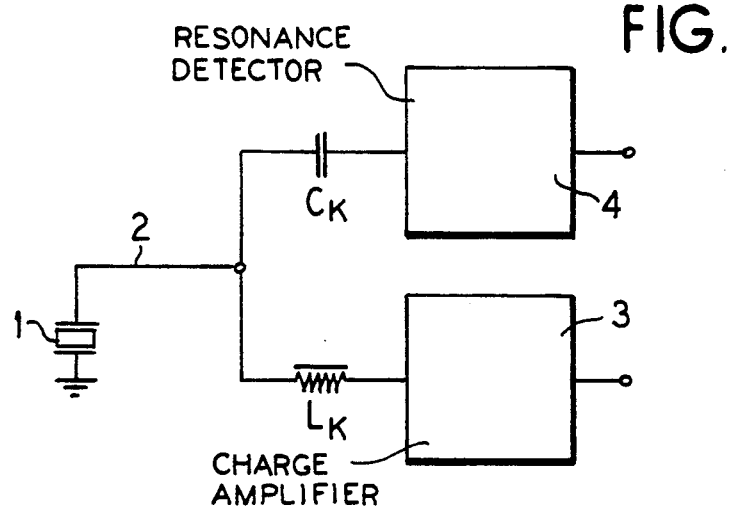
FIG. 1 is a schematic representation of the most simple form of outputting a higher-frequency that describes the resonant characteristic of a piezoelectric transducer element and a lower-frequency signal that describes the mechanical influence on this transducer element from the measured signal conducted via a single signal line.

In the most simple case when, namely, the two frequency ranges lie adequately far apart, a decoupling of the signals coming from the transducer element on the common signal line 2 suffices according to FIG. 1 for satisfying the above requirement, this decoupling being undertaken with an inductance $L_K$ and with a capacitor $C_K$. Since, for example given crystal pressure pick-ups devices, however, the frequency range of the first operating mode reaches into the proximity of the frequency range of the second operating mode, a simple L-C decoupling of the two interpretation devices (charge amplifier 3 and resonance detector 4), shown independently of one another in FIG. 1, is not adequate in the normal case.

Figure 2:
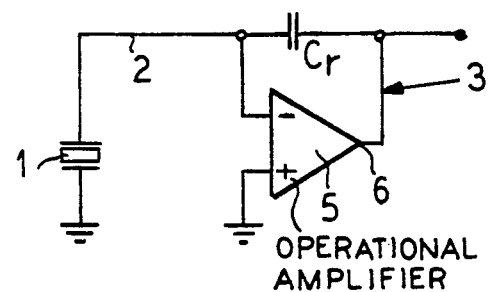
FIG. 2 is a fundamental circuit diagram of a piezoelectric transducer element having charge amplifier.

FIG. 2 shows the fundamental circuit of a charge amplifier having a piezoelectric transducer element 1 connected thereto. The signal line 2 is connected to the inverting input (−) of an operational amplifier 5 whose non-inverting input (+) is connected to the potential of the return (here, ground) and whose output 6 is fed back onto the inverting input via a capacitor $C_r$. The voltage available at the output 6 of the operational amplifier and, thus, of the charge amplifier is therefore proportional to the size of the mechanical influence on the piezoelectric transducer element 1 (Insofar as no misunderstandings can derive, the expressions "operational amplifier" and "charge amplifier" below are used simultaneously in conjunction with the component part referenced 5 and the same is also true moreover, for the expressions "sensor" and "transducer element".

Figure 3:
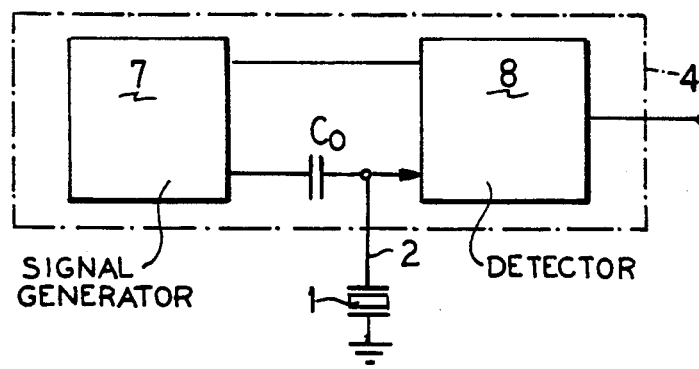
FIG. 3 is a fundamental circuit diagram of a resonance detector driving a piezoelectric transducer element having with a capacitor in a voltage divider arrangement.

FIG. 3 shows the fundamental circuit of a resonance detector, comprising a signal generator 7, the actual detector 8 and a capacitor $C_o$, whereby the piezoelectric transducer element 1 here is operated as a resonator having the capacitor $C_o$ in a voltage divider.

Figure 4:
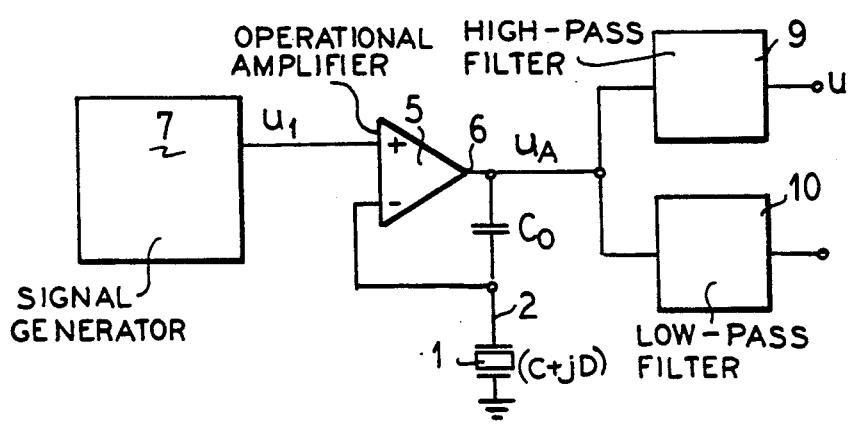

FIG. 4 then shows the fundamental circuit of a measuring arrangement of the invention in a simple embodiment thereof. The signal generator 7 drives the non-inverting input (+) of the operational amplifier 5 with a frequency signal whose mean value is equal to the grounded potential. At its output 6, the operational amplifier 5 delivers a superimposition of the signals of both operating modes, i.e. (except for a DC offset):

$$u_A = \frac{-Q}{C_o} + u_1 \cdot \left(1 + \frac{C + jD}{C_o}\right)$$

wherein:
$u_A$ ... output voltage of the operational amplifier 5
$C_o$ ... feedback capacitor
Q ... electrical charge output by the transducer element 1
$u_1$ ... frequency signal at the non-inverting input (+)
C ... real part of the complex-valued transducer capacitance; in a first approximation, this denotes the electrostatic capacitance of the transducer
D ... imaginary part of the complex-valued transducer capacitance; and
j ... imaginary unit.

With the assistance of a high-pass filter 9 and of a low-pass filter 10, the low-frequency signal $u_{NF}$ of the (charge amplifier) and the higher-frequency signal $u_{HF}$ for the (resonance detector) can be acquired from the output signal of the amplifier 5.

Figure 5:
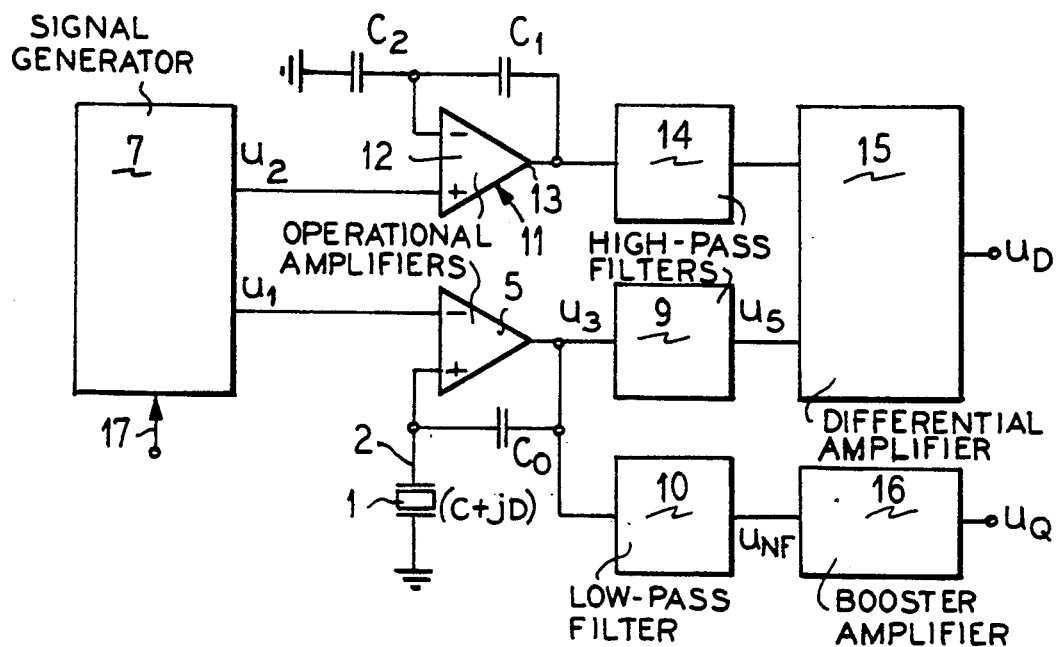

FIG. 5 now shows an addition to the circuit shown in FIG. 4 in order to acquire a clearer output signal that is more characteristic of the resonances of the transducer element. To that end, the signal generator 7 comprises a further frequency signal output that—with reference to the signal $u_1$ applied at the non-inverting input (+) of the charge amplifier (or, respectively, of the operational amplifier 5 in the charge amplifier)—carries a reference signal $u_2$ that is identical in frequency and phase and tunable in amplitude and that is connected to the non-inverting input (+) of a reference charge amplifier 11. The inverting input (−) of the operational amplifier 12 arranged in the reference charge amplifier 11 is connected via a capacitor $C_2$ to the potential of the return and is fed back to its output 13 via a further capacitor $C_1$. The output 13 of the reference charge amplifier 11 conducted via a further high-pass filter 14, just like the output 6 (via the high-pass filter 9), is connected to a differential amplifier 15 at whose output the signal $u_o$ that describes the resonance characteristic of the piezoelectric transducer element 1 can then be taken.

The output of the low-pass filter 11 carrying the signal $u_{NF}$ is connected to the input of a booster amplifier 16 at whose output an edited signal $u_Q$ is available.

With V=gain factor, it thus follows that:

$$u_D = V \cdot \left[ u_1 \cdot \left(1 + \frac{C + jD}{C_o}\right) - u_2 \cdot \left(1 + \frac{C_2}{C_1}\right) \right]$$

When the amplitude tuning at the input 17 of the signal generator 7 is then undertaken such that the real part of the signal $u_D$ disappears due to subtraction, then desired quantity is obtained that is proportional to the dissipative part D of the complex-valued transducer capacitance C+jD:

$$Im(u_D) = u_1 \cdot V \cdot \frac{D}{C_o}$$

$$Re(u_D) = 0 \text{ for } u_1 \cdot \left(1 + \frac{C}{C_o}\right) = u_2 \cdot \left(1 + \frac{C_2}{C_1}\right)$$

Simultaneously, the post-amplified signal $u_Q$ of the "charge amplifier" can be measured, this being proportional to the influencing, mechanical quantity.

Figure 6:
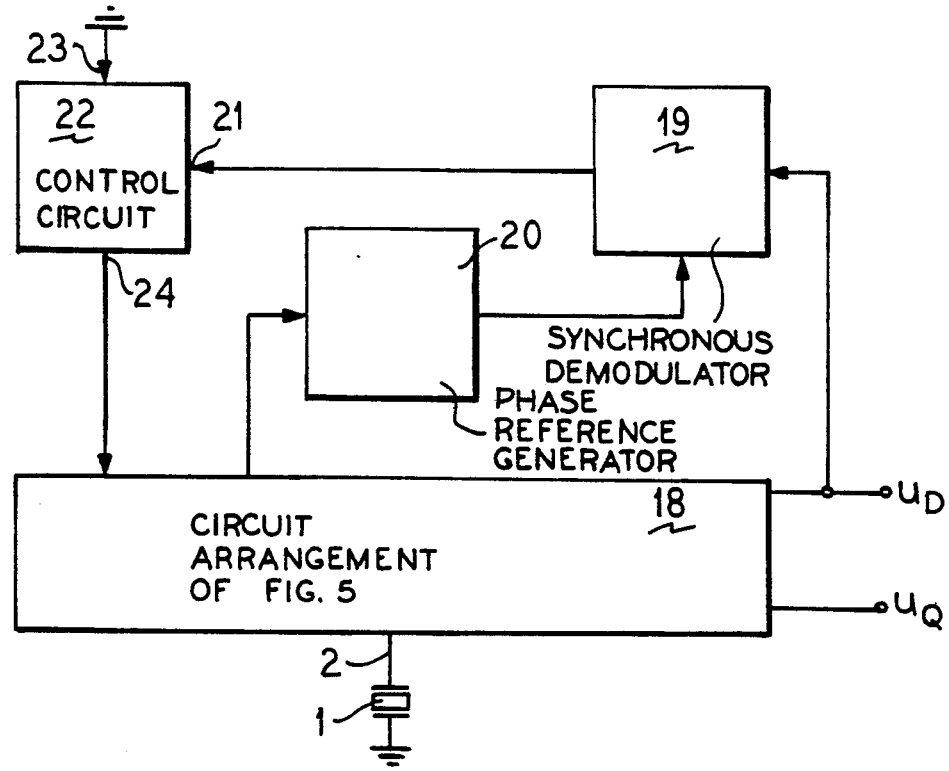

FIG. 6 shows the expansion of the circuit of FIG. 5 (symbolized by the box 18) by a controlling device for the automatic tuning of the measuring circuit. The high-pass-filtered output of the differential amplifier (signal $u_D$) is in communication with a synchronous demodulator 19 that is also connected to a unit 20 for generating a phase reference which is in turn connected to the signal generator (7 in FIG. 5), preferably to one of the frequency signal outputs thereof. The output of the synchronous demodulator 19 is connected to the actual value input 21 of a control circuit 22 that also comprises a reference value input 23 and a manipulated variable output 24. This manipulated variable output 24, for example, can lie directly at the input 17 of FIG. 5 or, on the other hand, at a tuning unit (not shown in detail) for tuning the relative amplitudes of the two output signals $u_1$, $u_2$ of the signal generator to one another. With the assistance of the said phase reference, the real part of the signal $u_D$ can be acquired in the synchronous demodulator 19 and can be tuned to zero in the closed loop.

Figure 7:
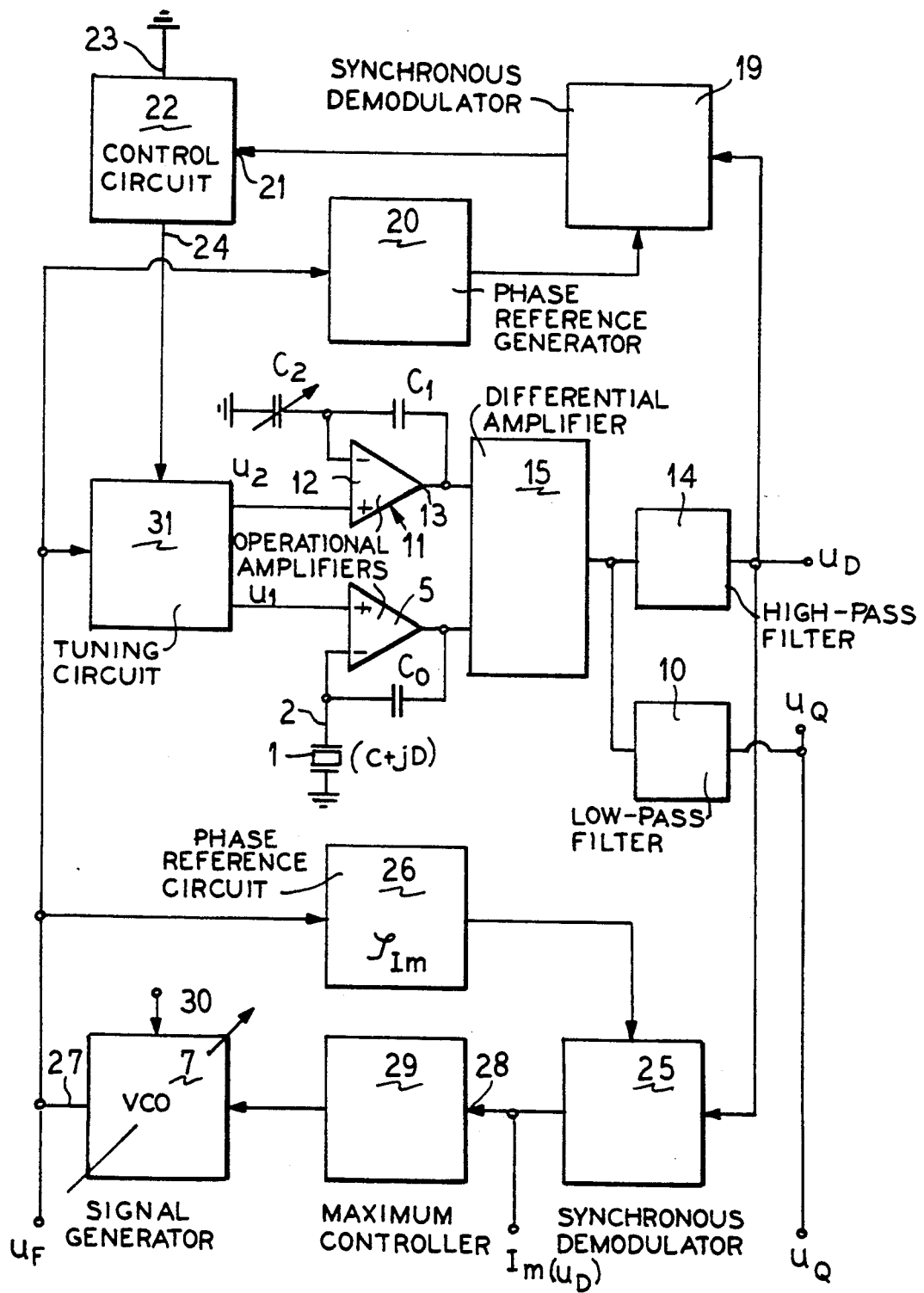

FIG. 7 shows the expansion of the resonance measuring circuit to form an oscillator. The upper part of the illustration essentially corresponds to a combination of FIGS. 5 and 6, whereby, in a departure from the illustration of FIG. 5, only the sequence of differential amplification and filtering is interchanged here. Identical or, respectively, components that are at least functionally equivalent are again provided with the reference characters that have already been employed above.

It may seen in the lower part of the illustration of FIG. 7 that the high-pass-filtered output of the differential amplifier 15 (signal $u_D$) is connected to a further synchronous demodulator 25 that is in turn in communication with a phase reference circuit 26. The phase reference circuit 26 itself is in turn connected to the frequency signal output 27 of the signal generator 7 fashioned as a VCO (voltage controlled oscillator). The output of the synchronous demodulator 25 is connected to the input 28 of a maximum controller 29 that is in, communication with the VCO (7) for fine tuning, the VCO (7) being preferably independently roughly tunable via an input 30.

With the assistance of the maximum controller 29, the VCO is set to the frequency of maximum dissipated power, i.e. to the resonant frequency of the transducer element 1. To that end, the imaginary part of $u_D$ is acquired in the synchronous demodulator 25 with the assistance of the phase reference from the unit 26 and is supplied to the maximum controller 29 an actual value. Three output signals are thereby simultaneously available:

1. The output signal $u_Q$ of the "charge amplifier";
2. The output signal $u_F$ related to the resonant frequency of the transducer element; and
3. The output signal having the imaginary part of $u_D$ that is characteristic of the dissipation in the transducer.

Supplementary to FIG. 7, it must also be pointed out that the control circuit 22 herein acts on a separate tuning unit 31 for the amplitude tuning of the two signals $u_1$ and $u_2$ that is supplied to the frequency signal output 27 of the VCO.

Figure 8:
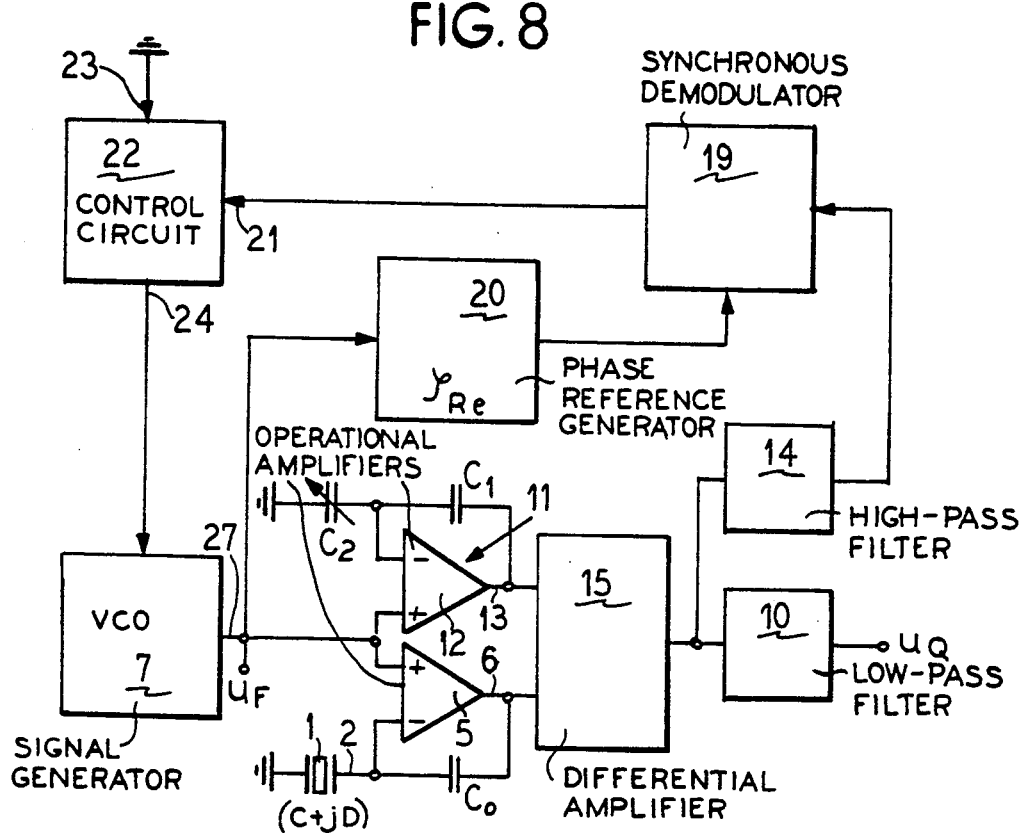

According to FIG. 8, the signal generator 7 is again executed as a VCO whose frequency signal output 27 is also connected to the non-inverting input (+) of the operational amplifier 12 arranged in the reference charge amplifier 11. The inverting input (−) of this operational amplifier 12 lies at the potential of the return via a variable capacitor $CC_2$ and is fed back to the output 13 via the capacitor $C_1$. The output 13 of the reference charge amplifier 11, just like the output 6 of the actual charge amplifier 5, is again connected to a differential amplifier 15. The output of the differential amplifier 15, as in FIG. 7, lies at a synchronous demodulator 19 via a high-pass filter 14; the output signal $u_Q$ is again obtained via the low-pass filter 10.

The synchronous demodulator 19 is also supplied with the output signal of a phase reference unit 20 that is likewise connected to the frequency signal output 27 of the VCO. The output of the synchronous demodulator 19 is connected to the actual value input 21 of a control circuit 22 that additionally comprises a reference value input 23 and that is connected via a manipulated variable output 24 to a frequency controlling input of the VCO.

The circuit of FIG. 8 illustrates a modification of the measuring amplifier for operation as charge amplifier on the one hand, and as oscillator for a frequency on the other hand. When the control circuit 22 of FIG. 6 for automatically tuning the measuring circuit is omitted and when it is provided instead that the required tuning is undertaken upon initialization of the circuit and is not re-tuned during operation, then the tuning criterion (namely that the real part of the signal $u_D$ is zero) can be employed for generating any frequency for which this condition is met. The pre-tuning can ensue manually or under computer control on the basis of a preceding analysis of the resonance characteristic of the piezoelectric transducer element 1 acquired with the assistance of the resonance detector, so that the frequency is a resonant frequency of this element. One or more of the indicated capacitors as well as a (tunable) capacitor (not entered herein) parallel to the piezoelectric transducer element 1 fundamentally come into consideration as tunable components.

Figure 9:
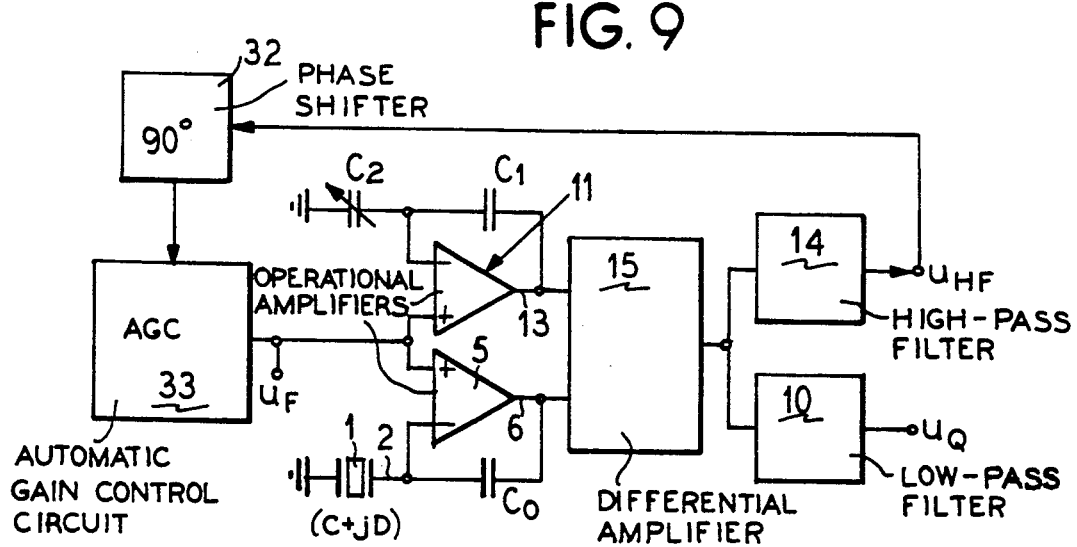

FIG. 9 shows a measuring arrangement constructed in accordance with the invention comprising a measuring amplifier as charge amplifier and as oscillator with direct feedback without intervening VCO. The actual signal generator here is realized with an active feedback of the signal $u_{HF}$ available at the output of the high-pass filter 14 executed as a band-pass filter to the non-inverting input (+) of the charge amplifier 5 as well as to the non-inverting input (+) of the reference charge amplifier 11. Just like the output 6 of the charge amplifier 5, the output 13 of the reference charge amplifier 11 is again connected to a differential amplifier 15 whose output is supplied to the band-pass filter 14 and to the low-pass filter 10. An element 32 (phase shifter) that executes a 90° phase angle rotation and an automatic gain control (AGC) circuit 33 are inserted into the active feedback path.

In the resonant case of the piezoelectric transducer element 1, the resonance detector tuned, for example, manually with the assistance of the capacitor $C_2$, supplies a maximum output signal whose phase is rotated by 90° relative to the exciting signal $u_F$. In order to satisfy the feedback condition for unattenuated oscillations, the output signal is additionally phase-rotated by 90° in the element 32. The loop gain is regulated to the required value 1 via the gain control unit 33. The band-pass filter (14) serves for the selection of a resonance within a defined frequency band. The low-frequency $u_Q$ of the charge amplifier can again be taken via the low-pass filter 10.

FIG. 10 shows a further embodiment of the measuring arrangement of FIG. 4. The frequency signal output 27 of the signal generator 7 is connected via an emitter follower 34 to the signal line 2 of the sensor or, respectively, transducer element 1. A respective constant current source 36 is inserted in the emitter line and in the collector line of the emitter follower transistor 35. The collector 37 of the emitter follower transistor 35 is connected to the inverting input (−) of the charge amplifier 5 whose non-inverting input (+) lies at the potential of the return. The two constant current sources 36 thereby serve the purpose of defining the DC operating point of the transistor 35.

The output $u_A$ at the output 6 of the charge amplifier 5 can thereby be portrayed (except for a DC offset) in the following way:

$$u_A = -Q/C_o + u_1 \cdot (C + jD)/C_o$$

As in the measuring arrangement of FIG. 4, the high-pass filter 14 and the low-pass filter 10 here also serve the purpose of separation into the two signals $u_{NF}$ and $u_{HF}$.

As an explanation related to FIG. 10, FIG. 11 shows a known embodiment of the constant current sources 36 as precision constant current sources. An operational amplifier 38 drives a field effect transistor (FET) 39 such that the voltage at the source resistor $R_S$ of the FET 39 is equal to the input voltage $u_o$. This is the case when a current $i_o = u_o R_S$ is drawn at the drain terminal D of the FET 39. The internal resistance of such a current source can be made extremely high (significantly greater than 1GΩ).

By analogy to FIG. 5, FIG. 12 then shows the expansion of the circuit or, respectively, measuring arrangement of FIG. 10 to form a resonance detector whose sensitivity for the resonance characteristic is significantly enhanced by subtractive compensation of the parallel capacitance of the transducer element 1. The frequency signal output (signal $u_1$) of the signal generator 7 lies at the non-inverting input (+) of an operational amplifier 40 whose output 41 is connected to the gate G of a FET 42 that is in turn fedback via source S onto the inverting input (−) of the operational amplifier 40 and is connected to a constant current source 36 as well as to the signal line 2 of the sensor or, respectively, transducer element 1. The inverting input (−) of the charge amplifier 5 is connected to the drain D of the FET 42 and to a further constant current source 36—the non-inverting input (+) of the charge amplifier 5 lies at a quiescent potential $u_o$, so that the drain potential of the FET 42 is thus also set to this value suitable for the operation of the FET 42.

The signal generator 7 comprises a further frequency signal output (signal $u_2$) that lies at the non-inverting input (+) of a reference operational amplifier 43 whose output 44 is connected to the gate G of a further FET 45. This FET 45 is fed back over its source S onto the inverting input (−) of the reference operational amplifier 43 and is connected to via its source S a constant current source 36 as well as to a capacitor $C_2$ whose other side lies at the potential of the return. The inverting input (−) of a reference charge amplifier 11 is connected to the drain D of the further FET 45 and to a further constant current source 36. The non-inverting input (+) of the reference charge amplifier 11 lies at the same quiescent potential $u_o$ as the charge amplifier 5, so that the drain potential is also set to this value suitable for the operation of the FET 45.

The outputs of the charge amplifier 5 on the one hand and of the reference charge amplifier 11 on the other hand (signals $u_3$ and $u_4$) are supplied to a differential voltage amplifier 15 whose output again is connected to the input of a high-pass filter as well as of a low-pass filter (14, 10).

Except for constant gain factors having an arbitrary operational sign, the following output signals are thereby obtained:

$$u_Q = V_Q \cdot A/C_o$$

$$u_D = V_D \cdot (u_1 \cdot (C+jD)/C_o - u_2 \cdot C_2/C_1)$$

When the tuning is undertaken such that the real part of the signal $u_D$ disappears due to the subtraction desired quantity is obtained that is proportional to the dissipative part D of the complex-valued transducer capacitance (C+jD):

$$Re\ (u_D) = 0\ for\ u_1 \cdot C/C_o = u_2 \cdot C_2/C_1$$

$$Im\ (u_D) = u_1 V_D \cdot D/C_o$$

Figure 13:
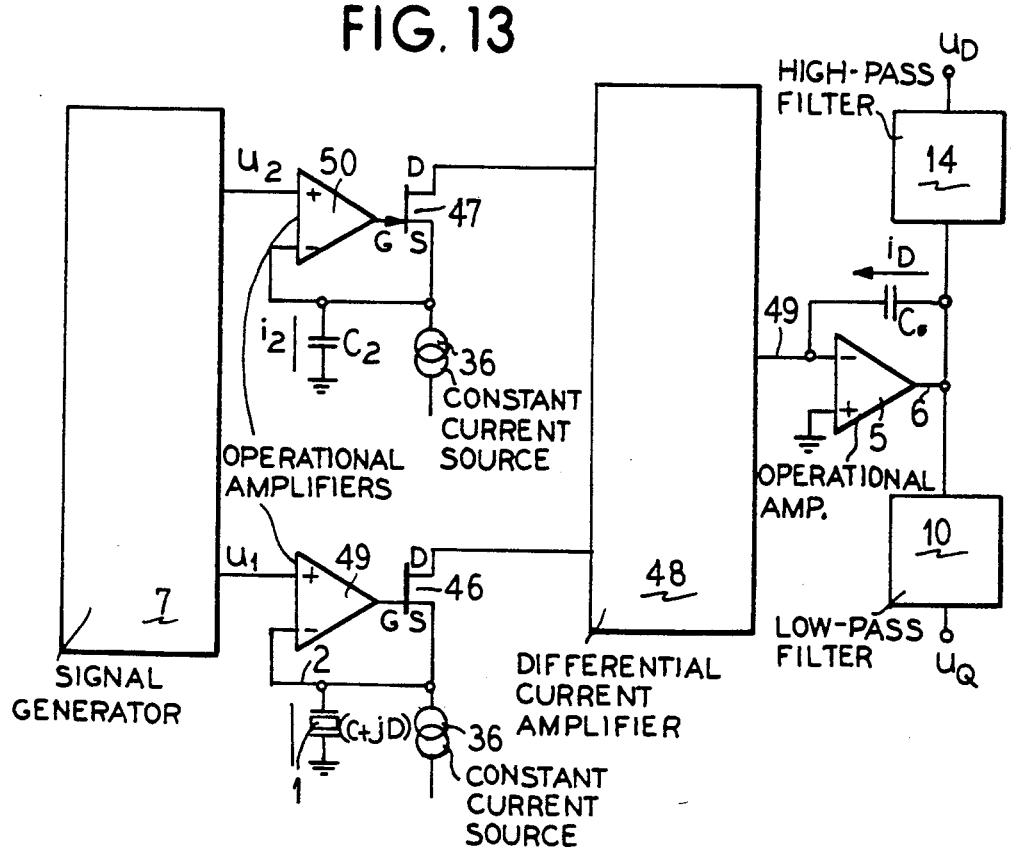

In the measuring arrangement of FIG. 13, the frequency signal output ($u_1$) of the signal generator 7 is connected to the non-inverting input (+) of an operational amplifier 49 whose output is connected to the gate G of a FET 46 that is in turn fed back over its source S onto the inverting input (−) of the operational amplifier 49 and is connected to a constant current source 36 as well as to the signal line 2 of the transducer element 1 in the sensor. The signal generator 7 comprises a further frequency signal output ($u_2$) that is connected to at the non-inverting input (+) of a reference operational amplifier 50 whose output is connected to the gate G of a further FET 47 that is in turn fed back over source S onto the inverting input (−) of the reference operational amplifier 50 and is connected to a further constant current source 36 as well as to a capacitor $C_2$ that has its other side connected to the potential of the electrical return. The drain terminals D of the two FETs 46, 47 are connected to a differential current amplifier 48 whose current output 49 is connected to the inverting input (−) of the charge amplifier 5 that has its non-inverting input (+) connected to the potential of the electrical return.

It is thus shown that the difference formation undertaken in order to improve the resonance measurement can be implemented not only with a differential voltage amplifier as in the embodiments according to the figures discussed up to now but can also be implemented with a differential current amplifier, for example with a current mirror circuit. It is thus possible to utilize a common charge amplifier for the differential current instead of two charge amplifiers for the currents $i_1$ and $i_2$.

Figure 14:
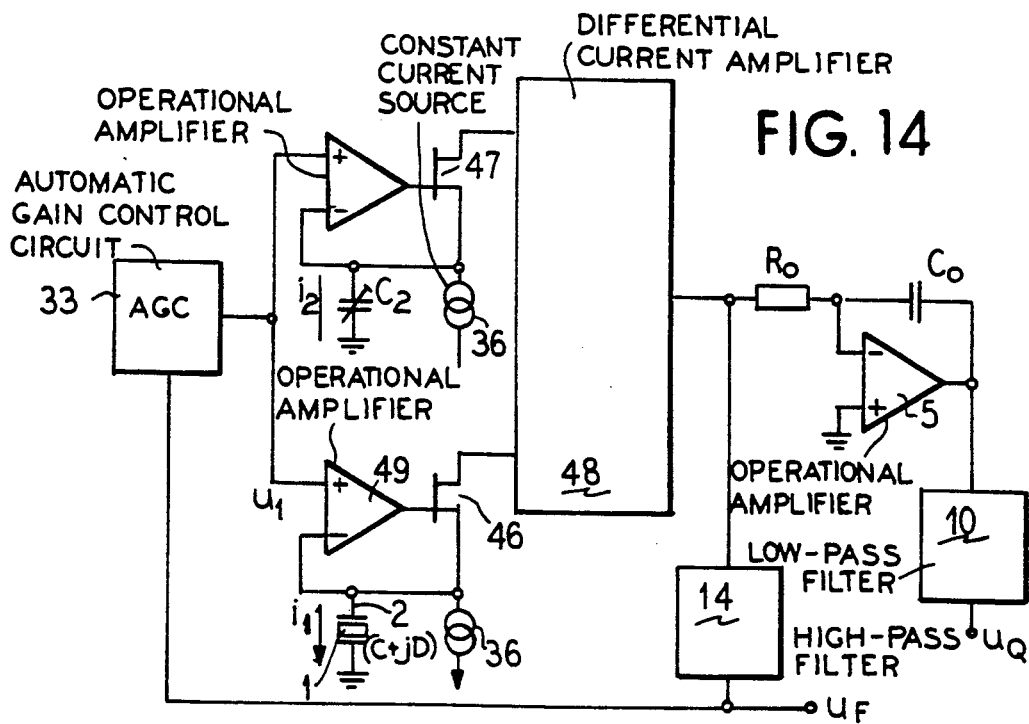

In the measuring arrangement of FIG. 14, the actual signal generator is realized with an active feedback of the signal $u_F$ available at the output of the high-pass filter 14 again executed as a band-pass filter to the non-inverting input (+) of an operational amplifier 49 as well as to the non-inverting input (+) of a reference operational amplifier 50. The output of these two operational amplifiers 49, 50 again respectively lies at the gate G of a respective FET 46, 47 whose respective source S is respectively connected to a separate constant current source 36 and fedback onto the inverting input (−) of the respective operational amplifier 49, 50. In the case of the operational amplifier 49, the signal line 2 of the transducer element 1 in the sensor is additionally connected to the source S of the FET 46; in the case of the reference operational amplifier 50, there is an additional connection of the source S to the potential of the electrical feedback via a variable capacitor $C_2$.

The drain terminals of the two FETs 46, 47 are again supplied to a differential current amplifier 48' that here additionally comprises an i/u (current/voltage) converter. The output of the amplifier 48' is connected, first, to the band-pass filter 14 and, second, to the inverting input (−) of the charge amplifier 5 via a, resistor $R_o$. An automatic gain control (AGC) circuit 33 is inserted in the feedback between band-pass filter 14 and non-inverting inputs (+) of the two operational amplifiers 49, 50.

The measuring arrangement of FIG. 14, just like that of FIG. 13, thus contains a differential current amplifier; the difference is that a proportional voltage signal is now generated from the differential current. This proportional voltage signal is amplified, first, via an integrator, so that the signal $u_Q$ that is proportional to the charge and, thus, to the mechanical input signal is again available via the low-pass filter 10. On the other hand, the voltage signal at the output of the differential current amplifier 48' is used in order to operate the circuit as a free-running oscillator with closed feedback. The AGC circuit 33 thereby sees to the observation of the amplitude condition (loop gain=1), whereby the phase condition (phase difference zero in the loop) is also satisfied in the resonant case of the piezoelectric transducer resonator. The band-pass filter 14 again serves the purpose of selecting the desired resonant frequency of the transducer element 1. The frequency signal $u_F$—the resonant frequency of the transducer element 1—can be taken, for example following the band-pass filter 14, as shown.

Figure 15:
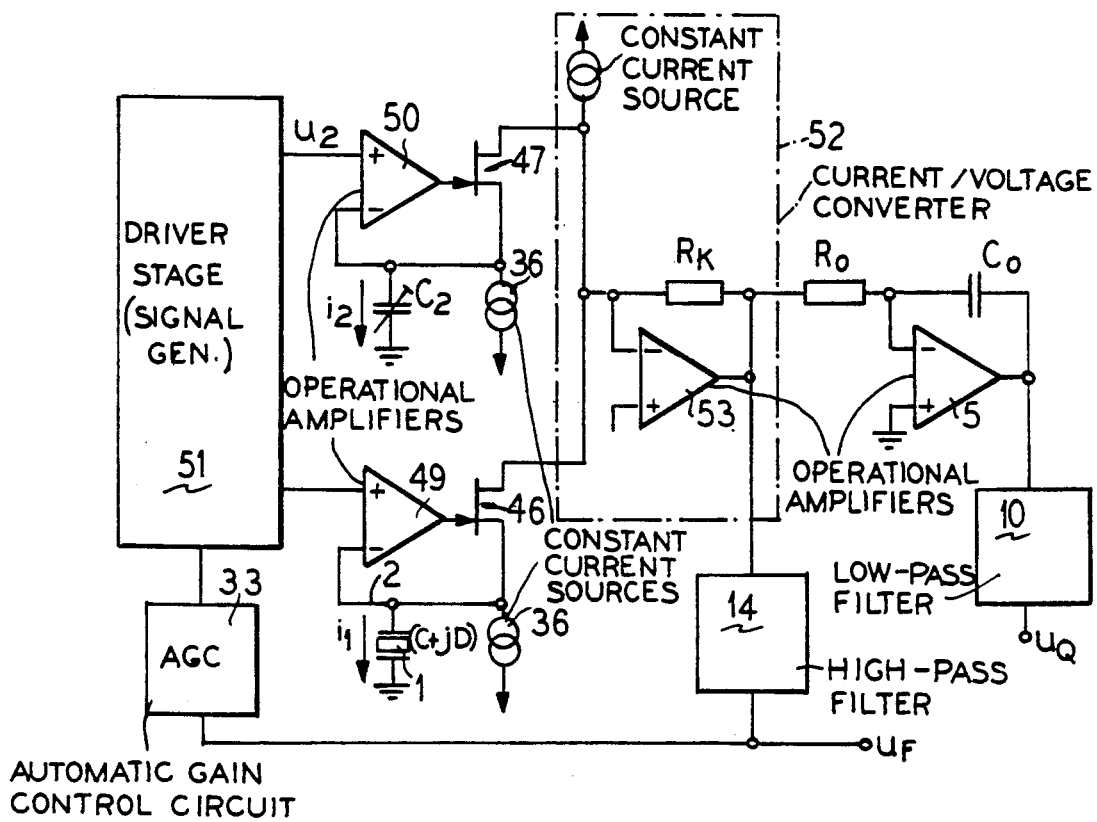

The embodiment of FIG. 15 essentially differs from that of FIG. 14 only in that a driver stage 51 that generates antiphase frequency signals for the two operational amplifiers is now inserted between the automatic gain control (AGC) circuit 33 and the non-inverting inputs (+) of the two operational amplifiers 49, 50, and in that a current addition circuit 52 is now provided instead of the differential current amplifier 48'.

The subtraction required for the reference measurement is thus implemented according to FIG. 15 not as in FIG. 14 by forming the differential current of the currents $i_1$ and $i_2$ generated from the two equiphase signals $u_1$ and $u_2$ but is now implemented by generating antiphase signals $u_1$ and $u_2$ and by addition of the resultant currents $i_1$ and $u_2$. The current-voltage converter in the circuit 52 is realized with the assistance of an operational amplifier 5 fed back via a resistor $R_K$. The generating of the antiphase signals $u_1$ and $u_2$ can ensue, for example, with the assistance of a differential amplifier having symmetrical outputs.

Figure 16:
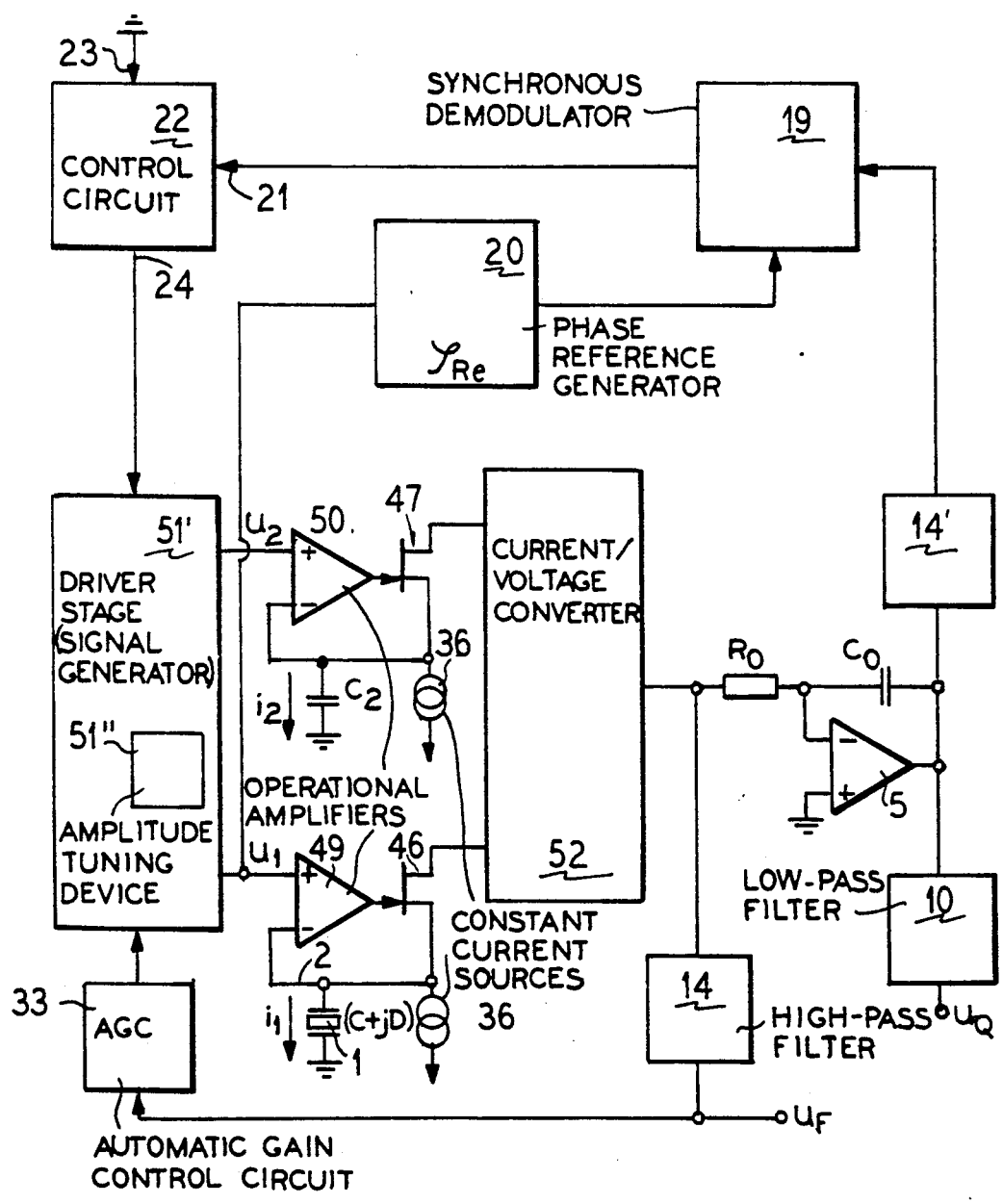

FIG. 16 shows an expansion of the measuring arrangement of FIG. 15. The arrangement of FIG. 14, for example, can, moreover, also be expanded in the same way. The driver stage 51' here comprises an additional unit (51") for amplitude tuning of the two antiphase frequency signals $u_1$ and $u_2$. The high-pass-filtered output (high-pass filter 14') is in communication with a synchronous demodulator 19 that is further connected to a phase reference generator 20 for generating a phase reference which is in turn in communication with the non-inverting input (+) of the operational amplifier 49. The output of the synchronous demodulator 19 is connected to the actual value input 21 of a control circuit 22 that further comprises a reference value input 23 and a manipulated variable output 24 whereof the latter is in communication with the unit 51" for amplitude tuning in the driver stage 51'. The circuit illustrated in FIG. 16 involves a precision oscillator and charge amplifier for the piezoelectric transducer element 1 in the corresponding sensor, having the outputs $u_F$ for the resonant frequency and $u_Q$ for the charge signal. The tuning of the arrangement ensues automatically as set forth above with reference to FIGS. 6 and 7, ensuing with the assistance of an amplitude tuning of $u_1$ and $u_2$. This tuning is controlled by the control circuit 22 that compares the reference value zero to the actual value supplied by the synchronous demodulator 19. A rough adjustment of the phase condition of the oscillator circuit is achieved in this way. The fine adjustment of the phase condition and, in conjunction with the AGC circuit 33, the adjustment of the amplitude condition ensues only at the resonant frequency of the piezoelectric transducer element 1 as a consequence of the co-coupling of the circuit, this resonant frequency being selected via the band-pass filter 14.

Figure 17:
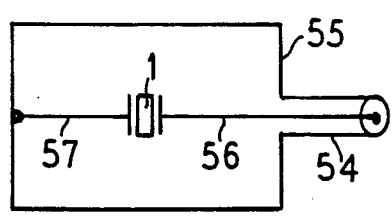

FIG. 17 symbolically shows a piezoelectric sensor that comprises a piezoelectric transducer element 1 in a housing 55 equipped with a connecting plug 54, this transducer element 1 being contacted via terminals 56, 57. The arrangement and specific design of the transducer element 1 are not shown here—in particular, this element 1 can be composed of an intrinsically arbitrary plurality of piezoelements (for example, crystal wafers). According to the above comments directed to the present invention, this one transducer element 1 according to FIG. 17 serves the purpose of operating the sensor in both possible operating modes.

Figure 18:
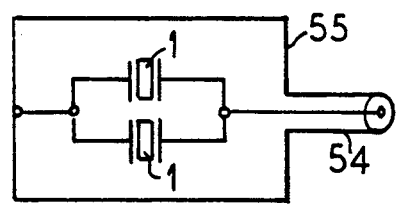

As the sole, significant departure from FIG. 17, two piezoelectric transducer elements 1 that can be optimized independently from one another for the respective operation are provided in FIG. 18 connected electrically parallel. For example, one of the transducer elements 1 can thus be optimized for the operation as resonator on the basis of a specific fashioning of its piezoelements or, respectively, the mounts thereof, whereas the other transducer element 1 is optimized to the operation upon exploitation of the direct piezoeffect. It must also be pointed out in this context that it is of no intrinsic significance within the scope of the present invention whether such a plurality of piezoelectric transducer elements are connected in parallel or in series with respect to the influence of the quantity to be measured or, respectively, to be monitored.

Figure 19:
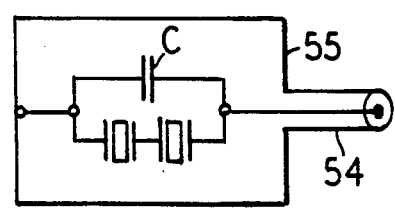

According to FIG. 19, two piezoelectric transducer elements 1 that are now electrically connected in series are again provided, these piezoelectric transducer elements 1 being arranged electrically parallel with a capacitor C in the housing 55 of the sensor.

We claim:

1. A method for measuring a mechanical or physical quantity applied to a piezoelectric sensor and simultaneously monitoring the resonance characteristics of the piezoelectric sensor, comprising the steps of:
   (a) applying a high-frequency excitation signal over a single signal line to the piezoelectric sensor;
   (b) generating a measured signal on the single signal line by exposing the sensor to a quantity to be measured so that, when electrically excited in the step (a), the sensor operates in two modes including a first low-frequency mode as a measuring element for a mechanical quantity utilizing the direct piezoelectric to produce a low frequency signal and a second, high-frequency mode utilizing the indirect piezo-effect for the electrical excitation of mechanical oscillations for generating a piezo reaction as a high-frequency signal and combining the low and high-frequency signals into a measuring signal;
   (c) receiving the measuring signal from the single signal line;
   (d) in response to a measuring signal received on the single signal lines in the step (c), producing a high-frequency signal representing the resonance characteristic of the piezoelectric sensor; and
   (e) in response to the measured signal received on the single signal line in the step (c), producing a low-frequency signal representing the mechanical influence applied to the piezoelectric sensor.

2. The method of claim 1, wherein the step (e) of producing a low-frequency signal is further defined as:

(e1) virtually shorting the low-frequency signal portion of the measuring signal applied to the single signal line resulting in a short-circuit current;

(e2) amplifying the short-circuit current; and (e3) integrating the amplified current of the step (e1) to obtain a charge-proportional output signal.

3. The method of claim 2, wherein the steps (d) and (e) are further defined as:

(d1) capacitively decoupling the high-frequency signal from the low-frequency signal.

4. The method of claim 2, wherein the steps (a), (d) and (e) are further defined as:

(a1) applying the voltage of the high-frequency excitation signal onto the single signal line; and (d1) and (e1) producing the respective high-frequency signal and low-frequency signal in response to the overall current flow through the piezoelectric sensor.

5. The method of claim 4, wherein the step (d) of producing the high-frequency signal is further defined as:

(d1) forming the amplitude difference between the measuring signal and a reference signal of the same frequency and phase; and (d2) adjusting the amplitudes of the high-frequency excitation signal and the reference signal relative to one another to control the production of the high-frequency signal from the measuring signal.

6. The method of claim 5, wherein the step (d2) is further defined as:

(d2a) amplitude tuning the relative amplitude until the real part of the high-frequency signal produced from the measuring signal disappears.

7. The method of claim 4, wherein the step (a) of applying a high-frequency excitation signal is further defined as:

(a1) band-pass filtering the high-frequency signal produced from the measuring signal; and (a2) feeding back the band-pass filtered signal while contemporaneously adjusting the feedback gain to the factor 1.

8. Measuring apparatus comprising:

a signal line;

a sensor including a piezoelectric transducer connected between said signal line and a reference potential and exposed to a variable mechanical quantity to be measured;

a signal generator for producing a high-frequency drive signal having a mean value equal to the reference potential; and measuring means comprising a charge amplifier including a first input, a second input and an output, said second input connected to said signal generator, sad output connected to said signal line, said first input connected to said signal line and via said single signal line to said piezoelectric transducer, and a feedback capacitor connected between said output and said first input, said measuring means driven by said high-frequency drive signal to produce a high-frequency excitation signal for said piezoelectric transducer;

said piezoelectric transducer operable in a first mode to produce low frequencies in response to the direct piezoeffect due to the changes of the mechanical quantity and, in a second mode, to produce higher frequencies in response to the inverse piezoeffect for the electrical excitation of mechanical oscillations and the direct piezoeffect for generating a piezo-electric reaction;

a high-pass filter connected to said output of said operational amplifier for taking off a first output signal which is dependent on and represents the resonance characteristic of said piezoelectric transducer; and a low-pass filter connected to said output of said operational amplifier for taking off a second output signal dependent on and representing the mechanical quantity.

9. The measuring apparatus of claim 8, wherein:

said charge amplifier comprises an operational amplifier including an inverting input as said first input, a non-inverting input as said second input and an output;

said signal generator is connected to said non-inverting input;

said signal line is connected to said inverting input;

said high and low-pass filters are connected to said output; and said feedback capacitor is connected between said output and said inverting input.

10. The measuring arrangement of claim 9, wherein said operational amplifier is a first operational amplifier, and said signal generator also produces a reference signal identical to the drive signal in frequency and phase, and further comprising:

a second operational amplifier including an inverting input, a non-inverting input and an output, a further feedback capacitor connected between said output and said inverting input of said second operational amplifier;

said non-inverting input of said second operational amplifier connected to said signal generator to receive said reference signal;

another capacitor connecting said inverting input of said second operational amplifier to the reference potential;

a further high-pass filter connected to said output of said second operational amplifier; and a differential amplifier including first and second inputs and an output, said inputs connected to respective ones of said high-pass filters and said output providing a signal representing the resonance characteristic.

11. The measuring apparatus of claim 10, and further comprising:

a booster amplifier connected to said low-pass filter for amplifying the low-frequency signals.

12. The measuring apparatus of claim 10, and further comprising:

a synchronous demodulator including an input connected to said output of said differential amplifier;

a phase reference generator connected between said signal generator and said synchronous demodulator for generating a phase reference; and a control device including a reference input connected to the reference potential, an input connected to said synchronous demodulator, and an output for providing a variable output tuning signal for adjusting the relative amplitudes of the drive and reference signals of said signal generator.

13. The measuring apparatus of claim 8, and further comprising:

a booster amplifier connected to said low-pass filter for amplifying the low-frequency signals.

14. A measuring apparatus comprising:

a signal line;

a sensor including a piezoelectric transducer connected between said signal line and a reference potential for exposure to a variable mechanical quantity to be measured, said piezoelectric transducer operable in a first mode to produce low frequencies in response to the direct piezoeffect due to the changes of the mechanical quantity and, in a second mode, to produce higher frequencies in response to the inverse piezoeffect for the electrical excitation of mechanical oscillations and the direct piezoeffect for generating a piezoelectric reaction;

signal generator means including a first output providing a high-frequency drive signal having a mean value equal to the reference potential and a second output providing an amplitude-adjustable reference signal equal in frequency and phase to said high-frequency drive signal;

measuring means comprising a charge amplifier comprising a first operational amplifier including an inverting input, a non-inverting input and an output, said non-inverting input connected to said first output of said signal generator means, said output connected to said signal line, said inverting input connected to said signal line and via said signal line to said piezoelectric transducer, and a feedback capacitor connected between said output and said inverting input, and a second operational amplifier including an inverting input, a non-inverting input connected to said second output of said signal generator means and an output, another feedback capacitor connected between said output and said inverting input of said second operational amplifier, and a further capacitor connecting said inverting input of said second operational amplifier to the reference potential, said measuring means driven by said high-frequency drive signal to produce a high-frequency excitation signal for said piezoelectric transducer;

a differential amplifier including a first input connected to said output of said first operational amplifier, a second input connected to said output of said second operational amplifier, and an output;

a high-fast filter connected to said output of said differential amplifier for providing a first output signal which is dependent on and represents the resonance characteristic of said piezoelectric transducer; and a low-pass filter connected to said output of said differential amplifier for providing a second output signal dependent on and representing the mechanical quantity.

15. The measuring apparatus of claim 14, wherein:

said signal generator means comprises a tuning circuit operable to adjust the relative amplitudes of said high-frequency drive and reference signals, and a control circuit connected to the reference potential and including an output connected to control said tuning circuit;

and wherein said apparatus further comprises phase reference generator means for generating a phase reference signal; and a synchronous demodulator connected to said high-pass filter to said phase reference generator means and to said control circuit and including an output for providing the real portion of the high-pass filtered signal to said control circuit to control said tuning circuit to adjust the relative amplitudes of said high-frequency drive and reference signals such that the real portion of said high-pass filtered signal becomes tuned to zero.

16. The measuring apparatus of claim 15, and further comprising:

a further synchronous demodulator connected to said high-pass filter;

a voltage-controlled oscillator in said signal generating means;

a phase reference circuit connected between said voltage-controlled oscillator and said further synchronous demodulator for causing said further synchronous demodulator to provide the imaginary portion of the high-pass filtered signal; and a maximum controller connected between said further synchronous demodulator and said voltage-controlled oscillator for fine tuning of said voltage-controlled oscillator to said high-frequency drive signal.

17. Measuring apparatus comprising:

a signal line;

a sensor including a piezoelectric transducer connected between said signal line and the reference potential for exposure to a variable mechanical quantity to be measured, said piezoelectric transducer operable in a first mode to produce low frequencies in response to the direct piezoeffect due to the changes of the mechanical quantity and, in a second mode, to produce higher frequencies in response to the inverse piezoeffect for the electrical excitation of mechanical oscillations and the direct piezoeffect for generating a piezoelectric reaction;

signal generator means comprising a voltage-controlled oscillator for producing a high-frequency drive signal having a mean value equal to the reference potential;

measuring means comprising a first operational amplifier including an inverting input, a non-inverting input and an output, said non-inverting input connected to said signal generator means, said output connected to said signal line, said inverting input connected to said signal line and via said signal line to said piezoelectric transducer, and a feedback capacitor connected between said output and said inverting input, a second operational amplifier including an inverting input, a non-inverting input connected to said signal generator means, and an output, another feedback capacitor connected between said output and said inverting input of said second operational amplifier, and a further capacitor connected between said inverting input of said second operational amplifier and the reference potential, said measuring means driven by said high-frequency drive signal to produce a high-frequency excitation signal for said piezoelectric transducer;

a differential amplifier including first and second inputs respectively connected to said outputs of said first and second operational amplifiers, and an output;

a high-pass filter connected to said output of said differential amplifier for providing a first output signal which is dependent on and represents the resonance characteristic of said piezoelectric transducer;

a low-pass filter connected to said output of said differential amplifier for providing a second output signal dependent on and representing the mechanical quantity;

a phase reference generator connected to said voltage-controlled oscillator for providing a phase reference signal;

a synchronous demodulator connected to said high-pass filter and to said phase reference generator for tuning the real part of the high-pass filtered signal to zero; and controlling means connected to the reference potential and connected between said synchronous demodulator and said voltage-controlled oscillator to apply a control voltage to said voltage-controlled oscillator in response to the real part of the high-pass filtered signal.

18. Measuring apparatus comprising:

a signal line;

a sensor including a piezoelectric transducer connected between said signal line and a reference potential for exposure to a variable mechanical quantity to be measured, said piezoelectric transducer operable in a first mode to produce low frequencies in response to the direct piezoeffect due to the changes of mechanical quantity and, in a second mode, to produce higher frequencies in response to the inverse piezoeffect for the electrical excitation of mechanical oscillations and the direct piezoeffect for generating a piezoelectric reaction;

signal generator means comprising a voltage-controlled oscillator for producing a high-frequency drive signal having a mean value equal to the reference potential;

measuring means comprising a first operational amplifier including an inverting input, a non-inverting input and an output, said non-inverting input connected to said signal generator means, said output connected to said signal line, said inverting input connected to said signal line and via said signal line to said piezoelectric transducer, and a feedback capacitor connected between said output and said inverting input, a second operational amplifier including an inverting input, a non-inverting input connected to said signal generator means, and an output, another feedback capacitor connected between said output and said inverting input of said second operational amplifier, and a further capacitor connected between said inverting input of said second operational amplifier and the reference potential, said measuring means driven by said high-frequency drive signal to produce a high-frequency excitation signal for said piezoelectric transducer;

a differential amplifier including first and second input respectively connected to said outputs of said first and second operational amplifiers, and an output;

a high-pass filter connected to said output of said differential amplifier for providing a first output signal which is dependent on and represents the resonance characteristic of said piezoelectric transducer;

a low-pass filter connected to said output of said differential amplifier for providing a second output signal dependent on and representing the mechanical quantity;

said signal generator means comprising a phase shifter connected to said high-pass filter for shifting the phase of the high-pass filtered signal by 90°, and an automatic gain control circuit connected to said phase shifter to maintain unity loop gain.

19. Measuring apparatus comprising:

a signal line;

a sensor including a piezoelectric transducer connected between said signal line and a reference potential for exposure to a variable mechanical quantity to be measured, said piezoelectric transducer operable in a first mode to produce low frequencies in response to the direct piezoeffect due to changes of the mechanical quantity and, in a second mode, to produce higher frequencies in response to the inverse piezoeffect for the electrical excitation o mechanical oscillations and the direct piezoeffect for generating a piezoelectric reaction;

a signal generator means for producing a high-frequency drive signal having a mean value equal to the reference potential;

an emitter-follower circuit comprising a transistor including abase connected to said signal generator means, a collector, and an emitter connected to said signal line, a first constant current source connected to said connector, and a second constant current source connected to said emitter;

measuring means comprising an operational amplifier including an inverting input, a non-inverting input and an output, said non-inverting input connected to said collector of said transistor, and a feedback capacitor connected between said output and said inverting input, said measuring means driven by said high-frequency drive signal to produce a high-frequency excitation signal for said piezoelectric transducer;

a high-pass filter connected to said output of said operational amplifier for providing a first output signal which is dependent on and represents the resonance characteristic of said piezoelectric transducer; and a low-pass filter connected to said output of said operational amplifier for providing a second output signal dependent on and representing the mechanical quantity.

20. Measuring apparatus comprising:

a signal line;

a sensor including a piezoelectric transducer connected between said signal line and a reference potential for exposure to a variable mechanical quantity to be measured, said piezoelectric transducer operable in a first mode to produce low frequencies in response to the direct piezoeffect due to changes of the mechanical quantity and, in a second mode, to produce higher frequencies in response to the inverse piezoeffect for the electrical excitation of mechanical oscillations and the direct piezoeffect for generating a piezoelectric reaction;

signal generator means including a first output providing a high-frequency drive signal having a mean value equal to the reference potential and a second output providing an amplitude-adjustable reference signal equal in frequency and phase to said high-frequency drive signal;

a detector including first, second, third and fourth operational amplifiers each including an inverting input, a non-inverting input, and an output;

said non-inverting inputs of said first and second operational amplifiers respectively connected to said first and second outputs of said signal generator means;

first and second feedback capacitors respectively connected between said output and said inverting input of said third and fourth operational amplifiers;

first, second, third and fourth constant current sources;

first and second field-effect transistors each including a gate, a drain, and a source;

said sources of said first and second field-effect transistors respectively connected to said first and third constant current sources and said drains of said first and second field-effect transistors respectively connected to said second and fourth constant current sources;

said source of said first field-effect transistor connected to said signal line and via said signal line to said piezoelectric transducer to supply said high-frequency excitation signal thereto, and further connected to said inverting input of said first operational amplifier;

said source of said second field-effect transistor connected to said inverting input of said second operational amplifier;

another capacitor connected between said source of said second field-effect transistor and the reference potential;

said drains of said first and second field-effect transistors respectively connected to said inverting inputs of said third and fourth operational amplifiers;

said non-inverting inputs of said third and fourth operational amplifiers connected to a predetermined quiescent potential;

a differential amplifier including first and second inputs respectively connected to said outputs of said third and fourth operational amplifiers, and an output;

a high-pass filter connected to said output of said differential amplifier for providing a first output signal which is dependent on and represents the resonance characteristic of said piezoelectric transducer; and a low-pass filter connected to said output of said differential amplifier for providing a second output signal dependent on and representing the mechanical quantity.

21. Measuring apparatus comprising:

a signal line;

a sensor including a piezoelectric transducer connected between said signal line and a reference potential for exposure to a variable mechanical quantity to be measured, said piezoelectric transducer operable in a first mode at low frequencies in response to the direct piezoeffect due to changes of the mechanical quantity and, in a second mode, at higher frequencies in response to the inverse piezoeffect for the electrical excitation of mechanical oscillations and the direct piezoeffect for generating a piezoelectric reaction;

a detector comprising first, second, and third operational amplifiers each including an inverting input, a non-inverting input, and an output, said non-inverting input of said third operational amplifier connected to the reference potential;

a feedback first capacitor connected between said output and said inverting input of said third operational amplifier;

second and third capacitors respectively connected between said inverting inputs of said first and second operational amplifiers and the reference potential, said piezoelectric transducer constituting said second capacitor;

first and second field-effect transistors each including a gate connected to said output of a respective one of said first and second operational amplifiers, a source connected to said inverting input of a respective one of said first and second operational amplifiers, and a drain;

first and second constant current sources connected to said sources of respective ones of said first and second operational amplifiers;

said non-inverting input of said first operational amplifier connected to said signal generator means to receive said high-frequency drive signal for producing said excitation signal for said sensor;

said non-inverting input of said second operational amplifier connected to said signal generator means to receive said high-frequency drive signal as a reference signal;

a differential amplifier including a first input connected to said drain of said first field effect transistor to receive low and high-frequency signals of said piezoelectric transducer, a second input connected to said drain of said second field-effect transistor to receive the reference frequency signal, and an output connected to said inverting input of said third operational amplifier;

a high-pass filter connected to said output of said differential amplifier for providing a first output signal which is dependent on and represents the resonance characteristic of said piezoelectric transducer; and a low-pass filter connected to said output of said differential amplifier for providing a second output signal dependent on and representing the mechanical quantity.

22. The measuring apparatus of claim 21, wherein:

said high-pass filter and sad low-pass filter are connected to said output of said differential amplifier via said third operational amplifier and are connected to said output of said third operational amplifier.

23. The measuring apparatus of claim 21, wherein said signal generator means comprises:

a first output connected to said non-inverting input of said first operational amplifier for providing the high-frequency drive signal thereof; and a second output connected to said non-inverting input of said second operational amplifier for providing a high-frequency reference signal thereto of equal frequency and phase as said high-frequency drive signal.

24. The measuring apparatus of claim 21, wherein:

said high-frequency filter is a band-pass filter.

25. The measuring apparatus of claim 24, wherein:

said signal generator means comprises an automatic gain control circuit including an input connected to said band-pass filter and an output connected to said non-inverting inputs of said first and second operational amplifiers.

26. Measuring apparatus comprising:

a signal line;

a sensor including a piezoelectric transducer connected between said signal line and a reference potential for exposure to a variable mechanical quantity to be measured, said piezoelectric transducer operable in a first mode to produce low frequencies in response to the direct piezoeffect due to changes of the mechanical quantity and, in a second mode, to produce higher frequencies in response to the inverse piezoeffect for the electrical excitation of mechanical oscillations and the direct piezoeffect for generating a piezoelectric reaction;

signal generator means comprising a controllable driver stage including a control input, a first output providing a high-frequency drive signal having a mean value equal to the reference potential and a second output providing a reference signal of the same frequency as an anti-phase with respect to said high-frequency drive signals;

first, second and third operational amplifers each including an inverting input, a non-inverting input, and an output, said non-inverting input of said third operational amplifier connected to the reference potential;

a feedback first capacitor connected between said output and said inverting input of said third operational amplifier;

second and third capacitors respectively connected between said inverting inputs of said first and second operational amplifiers and the reference potential, said piezoelectric transducer constituting said second capacitor;

first and second field-effect transistors each including a gate connected to said output of a respective one of said first and second operational amplifiers, a source connected to said inverting input of a respective one of said first and second operational amplifiers, and a drain;

first and second constant current sources connected to said sources of respective ones of said first and second operational amplifiers;

said non-inverting input of said first operational amplifier connected to said signal generator means to receive said high-frequency drive signals for producing said excitation signal for said sensor;

said non-inverting input of said second operational amplifier connected to said second output of said signal generator means to receive said high-frequency anti-phase signal as a reference signal;

a current/voltage converter amplifier including a first input connected to said drain of said first field-effect transistor to receive low and high-frequency signals of said piezoelectric transducer, a second input connected to said drain of sid second field-effect transistor to receive the anti-phase reference frequency signal, and an output connected to said inverting input of said third operational amplifier;

a high-pass filter connected to said output of said current/voltage converter amplifier for providing a first output signal which is dependent on and represent the resonance characteristic of said piezoelectric transducer; and a low-pass filter connected to said output of said operational amplifier voltage converter for providing a second output signal dependent on and representing the mechanical quantity.

27. The measuring apparatus of claim 26, wherein:
said current/voltage converter comprises a fourth operational amplifier including a non-inverting input connected to a predetermined quiescent potential, an inverting input connected to said drain of said first and second field-effect transistors, and an output, a feedback resistor connected between said output and said inverting input of said fourth operational amplifier, and a third constant current source connected to said inverting input;

said signal generator further comprises an automatic gain control circuit connected to said control input of said driver stage; and said high-pass filter is connected to said automatic gain control circuit for controlling the gain by controlling the operation of said driver stage.

28. The measuring apparatus of claim 27, and further comprising:

a phase reference generator connected to said first output of said driver stage of said signal generator means for providing a phase reference signal;

a further high-pass filter connected to said output of said third operational amplifier;

a synchronous demodulator connected to said phase reference generator and to said further high-pass filter;

a further control input included in said signal generator means; and a control circuit connected to the reference potential and connected to said synchronous demodulator and to said further control input for controlling amplitude tuning of said high-frequency drive and anti-phase reference signals.

29. A method of measuring a mechanical quantity with a sensor and simultaneously monitoring the functioning of the sensor, comprising the steps of:

(a) operating a piezoelectric transducer connected to a single signal line for exposure to a mechanical quantity by (a1) exciting the piezoelectric transducer with a high-frequency drive signal and (a2) applying a mechanical quantity to the piezoelectric transducer such that the piezoelectric transducer operates, in a first mode, at low frequencies in response to the direct piezoeffect due to changes in the mechanical quantity and, in a second mode, at higher frequencies in response to the inverse piezoeffect for the electrical excitation and the direct piezoeffect for generating a piezoreaction and apply the low and high-frequency signals to the single signal line; and (b) monitoring the operation of the piezoelectric transducer by (b1) detecting the signals on the single signal line, (b2) separating the signals into low-frequency signals and high-frequency signals, and (b30 simultaneously monitoring the separated low and high-frequency signals which respectively represent the mechanical quantity and the resonance characteristic of the piezoelectric transducer, the latter indicating the functioning of the transducer.

30. A method of measuring at least two quantities which comprise a mechanical first quantity and a second quantity comprising one of a mechanical quantity and a physical quantity, comprising the steps of:

(a) operating at least two piezoelectric transducers, each assigned a respective one of the two quantities and connected to a single signal line by (a1) exciting the piezoelectric transducers with a respective high-frequency drive signal and (a2) applying a respective quantity to be measured to the at least two piezoelectric transducers such that at least one of the piezoelectric transducers basically operates, in a first mode, at low frequencies in response to the direct piezoeffect due to changes in the respective quantity being measured and such that another of said piezoelectric transducers operates basically in a second mode, at higher frequencies in response to the inverse piezoeffect for the respective electrical excitation and the direct piezoeffect for generating a respective piezoreaction, which is influenced by the quantity being measured, and apply the low and high-frequency signals onto the single signal line; and (b) monitoring the operation of the at least two piezoelectric transducers by (b1) detecting the signals on the single signal line, (b2) separating the signals into respective low-frequency signals and respective high-frequency signals, and (b3) monitoring the separated respective low-frequency signals and respective high-frequency signals, where the low-frequency signals represent the mechanical first quantity and the high-frequency signal represents the resonance characteristic of the respective piezoelectric transducer, which represents the second quantity being measured due to the influence of the quantity of the resonance characteristic of the respective transducer.

* * * * *